US007076415B1

(12) United States Patent
Demler et al.

(10) Patent No.: US 7,076,415 B1
(45) Date of Patent: Jul. 11, 2006

(54) SYSTEM FOR MIXED SIGNAL SYNTHESIS

(75) Inventors: Michael J. Demler, Scotts Valley, CA (US); Stephen Lim, Scotts Valley, CA (US); Geoffrey Ellis, Santa Cruz, CA (US); Leslie D. Spruiell, Santa Clara, CA (US); Robert W. McGuffin, Felton, CA (US); Bent H. Sorensen, Le Vaud (CH)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/560,844

(22) Filed: Apr. 28, 2000

Related U.S. Application Data

(63) Continuation-in-part of application No. 09/216,752, filed on Dec. 17, 1998, now Pat. No. 6,356,796.

(60) Provisional application No. 60/140,108, filed on Jun. 18, 1999, provisional application No. 60/162,736, filed on Oct. 29, 1999, provisional application No. 60/164,220, filed on Nov. 9, 1999.

(51) Int. Cl.
*G06F 17/50* (2006.01)

(52) U.S. Cl. .............................. 703/14; 703/20; 716/2; 716/4; 716/18

(58) Field of Classification Search ............ 703/14–16, 703/2, 13, 19, 20; 716/2, 18, 3, 5, 6, 7, 10, 716/4
See application file for complete search history.

(56) References Cited

U.S. PATENT DOCUMENTS

| 5,278,769 | A  |   | 1/1994  | Bair et al. ................... 364/490    |
| 5,297,053 | A  |   | 3/1994  | Pease et al. ........... 364/474.24        |
| 5,404,319 | A  | * | 4/1995  | Smith et al. ................... 716/18    |
| 5,481,484 | A  | * | 1/1996  | Ogawa et al. ................ 703/14       |
| 5,544,066 | A  |   | 8/1996  | Rostoker et al.                            |
| 5,551,014 | A  |   | 8/1996  | Yoshida et al. ............. 395/500       |
| 5,553,002 | A  |   | 9/1996  | Dangelo et al. ............ 364/489        |
| 5,598,344 | A  |   | 1/1997  | Dangelo et al.                             |
| 5,633,803 | A  |   | 5/1997  | Silve et al. ................. 364/488     |
| 5,691,912 | A  |   | 11/1997 | Duncan ...................... 364/490      |
| 5,801,958 | A  | * | 9/1998  | Dangelo et al. .............. 716/18       |
| 5,809,283 | A  | * | 9/1998  | Vaidyanathan et al. ....... 703/16         |
| 5,812,416 | A  | * | 9/1998  | Gupte et al. ................... 716/2     |
| 5,983,277 | A  | * | 11/1999 | Heile et al. .................. 709/232    |
| 6,009,256 | A  | * | 12/1999 | Tseng et al. .................. 703/13     |
| 6,181,754 | B1 | * | 1/2001  | Chen .......................... 375/350    |
| 6,269,467 | B1 | * | 7/2001  | Chang et al. ................... 716/1     |
| 6,317,860 | B1 | * | 11/2001 | Heile ............................ 716/5   |
| 6,334,207 | B1 | * | 12/2001 | Joly et al. ..................... 716/17   |
| 6,356,796 | B1 | * | 3/2002  | Spruiell et al. ............... 716/18     |

(Continued)

OTHER PUBLICATIONS

Smith and Brown, Mixed Signal Circuit Simulation System with Behavioral Modeling Capability, IEEE 1994.*

(Continued)

*Primary Examiner*—W. Thomson
(74) *Attorney, Agent, or Firm*—Fliesler Meyer, LLP

(57) ABSTRACT

Circuit synthesis is performed utilizing an optimizer that selects design parameters for a synthesis model of a circuit based on desired performance characteristics and performance characteristics/design parameters of previously synthesized circuits. Performance characteristics and design parameters of each synthesized circuit are maintain in conjunction with the synthesis model of the circuit being synthesized. A synthesis plan identifies the synthesis model and specific instructions on how to perform optimized selection of design parameters, how to set up test benches, and how to perform the simulation.

14 Claims, 17 Drawing Sheets

U.S. PATENT DOCUMENTS

| | | | |
|---|---|---|---|
| 6,421,818 B1 * | 7/2002 | Dupenloup et al. | 716/18 |
| 6,477,683 B1 * | 11/2002 | Killian et al. | 716/1 |
| 6,557,145 B1 * | 4/2003 | Boyle et al. | 716/2 |
| 6,637,018 B1 * | 10/2003 | Demler | 716/18 |
| 6,678,645 B1 * | 1/2004 | Rajsuman et al. | 703/20 |
| 6,721,922 B1 * | 4/2004 | Walters et al. | 716/18 |
| 6,813,597 B1 * | 11/2004 | Demler | 703/14 |
| 6,910,200 B1 * | 6/2005 | Aubel et al. | 703/13 |

OTHER PUBLICATIONS

PCT International Search Report of Jun. 19, 2000.

* cited by examiner

SYSTEM FOR MIXED SIGNAL SYNTHESIS

This application is a continuation-in-part of Ser. No. 09/216,752, filed Dec. 17, 1998 now U.S. Pat. No. 6,356,796, now U.S. Pat. No. 6,356,796 entitles "LANGUAGE CONTROLLED DESIGN FLOW FOR ELECTRONIC CIRCUITS". Additionally, this application claims priority to each of the following provisional patent applications:

(1) Demler, a provisional patent application Ser. No. 60/140,108, filed Jun. 18, 1999, entitled "MIXED SIGNAL SYNTHESIS,"
(2) Demler, a provisional patent application Ser. No. 60/162,736, filed Oct. 29, 1999, entitled "MIXED SIGNAL SYNTHESIS (MSS) ADDENDUM," and
(3) Ellis et al., a provisional patent application Ser. No. 60/164,220, filed Nov. 9, 1999, entitled "LEARNING MODE OPTIMIZATION," each of which are incorporated herein by reference, in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to design tools for automating design process. The invention is more particularly related to the sharing of specific knowledge between a suite of design tools utilized in an automated design process. The invention is still further related to a process of performing a design where instructions, stored in a master plan, are shared between different design tools and instruct the design tools on how to apply themselves to specific design situations. The invention is yet more specifically related to the use of design tools and related master plan instructions that allow reuse of Expert Designer knowledge for design of Analog and Mixed Signal circuits.

BACKGROUND OF THE INVENTION

The development of integrated circuits requires many specialized software programs (tools) that perform certain analyses and data transformations. These analyses and data transformations provide the vehicle by which the designer develops, and proofs formalized descriptions of the integrated circuits design. These formalized descriptions can be used to manufacture the integrated circuits according to the design. The collection of these tools so that they enable a coherent design process is known as a design flow.

The field of circuit simulations has many design languages, simulators, and design programs available to circuit design engineers. One commonly utilized design language is the Verilog® (a registered trademark of Cadence Design Systems, Inc.).

Verilog® is a hardware description language that provides a means of specifying a digital system at a wide range of abstraction levels. The language supports the early conceptual stages of design with its structural level of abstraction. The language provides hierarchical constructs, allowing the designer to control the complexity of a description.

Other analysis tools have been developed around the Verilog® language, including fault simulators, and timing analyzers, and the language has provided input specification for some logic and behavioral synthesis tools. The language has been standardized as IEEE standard #1364-1995, and is described in detail in "The Verilog® Hardware Description Language," by Donald E. Thomas and Phillip R. Moorby, and is incorporated herein by reference.

Analog circuits are commonly simulated by SPICE (Simulation Program with Integrated Circuit Emphasis), a commercially available software program for simulating analog circuits. SPICE frees engineers from the laborious, and often complex, time consuming tasks of analog circuit analysis. SPICE was originally developed by a team at the University of California at Berkeley and consists of a set of powerful algorithms for a wide range of circuit analysis methods. Many of SPICE function have been implemented on a personal computer platform, as described in "The Illustrated Guide to PSPICE®," by Robert Lamey, which is incorporated herein by reference.

As with Verilog®, the SPICE language has been utilized in many other tools and simulations. In addition, various vendors and groups have attempted to apply similar principles to analog synthesis such as module generators (OPASYN, CADICS, and ADORE from UC Berkeley, and VASE from University of Cincinnati, for example) and topology optimizers (IDAC/ILAC or AutoLinear marketed by Silicon Compiler Systems, AMGIE by Leuven, ASTRX/OBLX by CMU, for example). However, commercially available tools do not provide true synthesis of analog or mixed analog regardless of the underlying description languages or simulators.

SUMMARY OF THE INVENTION

The present inventors have realized that analog and mixed signal synthesis may be performed. Roughly described, the present invention allows a top down design of mixed-signal systems and combines a high performance, mixed mode, single kernal simulation with behavioral modeling of circuits, automated characterization, a mixed-signal cell library, and optimization algorithms that perform computer aided design and realization of analog circuits. The realized analog circuits may be provided in any form, but are currently provided as fully dimensioned circuits or netlists that meet a users selected performance constraints and can be laid out (placed and routed) in a selected semiconductor technology. These same circuits may be applied to analog circuitry requirements or have digital features added.

The present invention meets at least two broad design objectives:

1. Increase productivity of the analog and mixed signal designer; and
2. Extend design capabilities.

The objectives are met by capturing the knowledge of an expert circuit designer (or cell designer/plan author) in how a circuit is constructed and partitioned, how to propagate higher level performance constraints to the lower, cell level, and in what order to synthesize the cells. The non-creative objectives met include activities like characterization, optimization, and simulation, once options and parameters for these activities have been decided.

The present invention includes an authoring tool in which a plan author builds a synthesis library of circuit designs and one or more plans for a specific circuit being designed or for general use. The plan captures the expert knowledge of the plan author for that specific type of circuit. The plan is stored in a synthesis library. Following users may then use the plan referred to herein as a master plan or synthesis plan) and need not know any of the particular details (expert or plan author knowledge) for designing that type of circuit.

Traditional design flows manage their data flows without regard for the information that is contained within the design data. In this respect, they treat the design data as a homogeneous and ignore the many special cases presented by the content of the descriptions. As a result, the individual tools must each be encoded with these special cases leading to much increased complexity.

In contrast, the present invention utilizes the master plan, shared by plural design tools, having instructions on how to apply each of the design tools to specific situations of the design. The invention includes a method of design that incorporates specific knowledge about situations of a design to plural design tools, each design tool performing a different part or function of the overall design.

In addition to controlling when to apply a given design tool in a design flow, the present invention also includes the ability to define, in a master plan, how to apply a given design tool to a specific design situation.

Therefore, the benefits of using the present invention for analog design can be summarized as:
  i. Capture of designer knowledge;
  ii. Shorten design cycle by automating time-consuming aspects of design, allowing the designer to focus on actual design issues; and
  iii. Make designer knowledge re-usable. Benefits for extending design capability, include
    1) Enabling a top-down mixed signal design methodology; and
    2) Execution of design plans without requiring a high level of analog expertise.

The invention is implemented by a synthesis engine that utilizes the pre-built master plans for circuit design that include basic circuit topologies and parameterized design criteria that has been fitted to at least one model for circuit optimization. Various implementations may be utilized, such as table models, polynomial-based behavior models, etc.

In operation, a user of the present invention selects a plan (master plan) from a synthesis library, and specifies a set of performance criteria, and the synthesis engine calculates a circuit fitting the input performance criteria. The synthesis engine outputs a sized netlist or other identification of the circuit design, a simulation script for later verification of circuit performance, and performance specs in the form of a datasheet.

Furthermore, many of the programming instructions in existing electronic design automation programs involve the transformation of data from one specific format into another specific format in order to pass the design data from program to program. These programs spend a great deal of their time reconstructing information internally and then simply ignoring that information when it comes time to generate output for the next tool in the flow. The present invention, by taking advantage of the information inherent in the design data, reduces the amount of time performing operations again and again inside each tool, leading to increased performance and a reduced chance of error.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
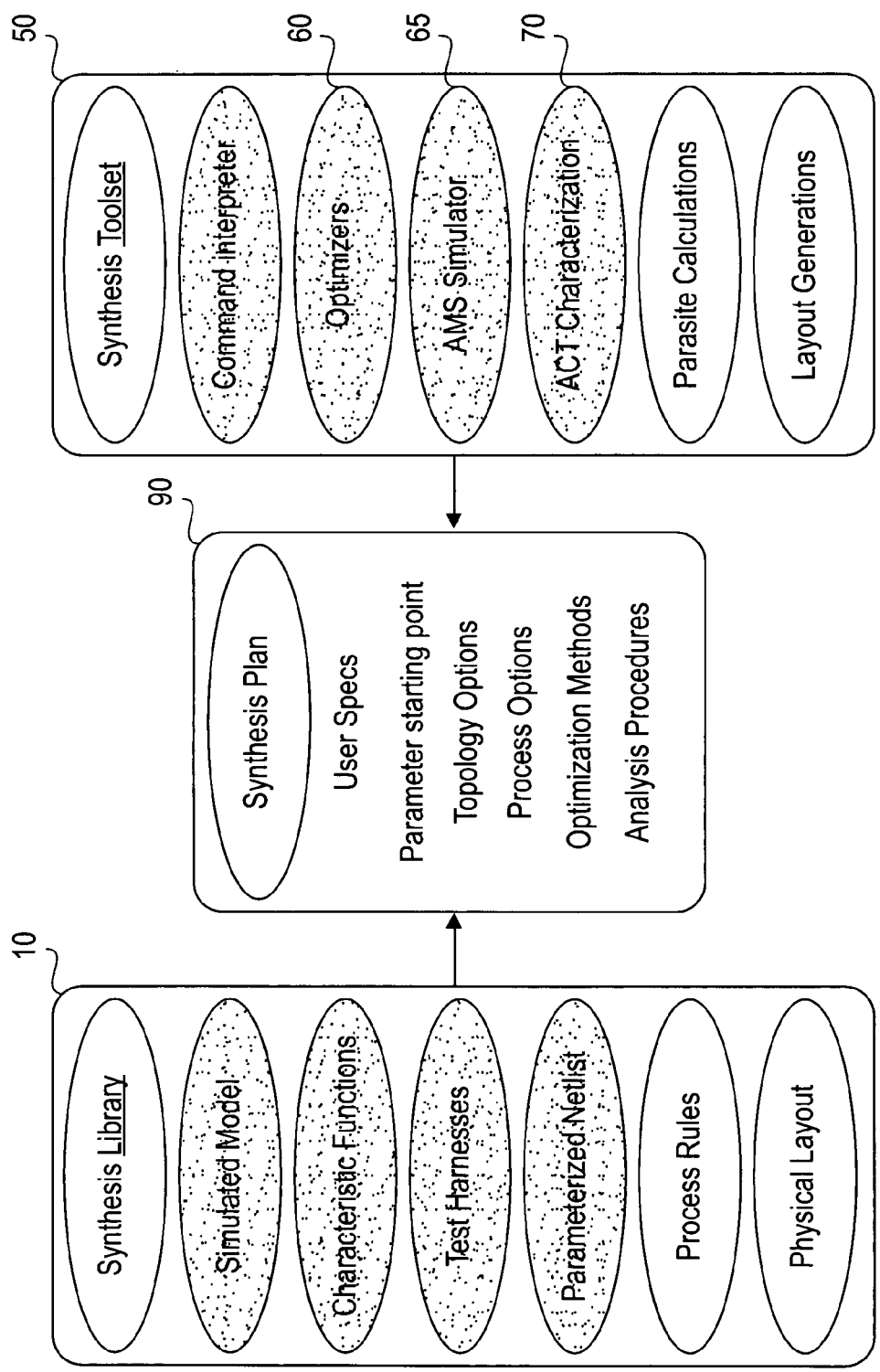
FIG. 1 is a block diagram illustrating the related functions to be combined in a mixed-signal development environment.
Figure 1A:
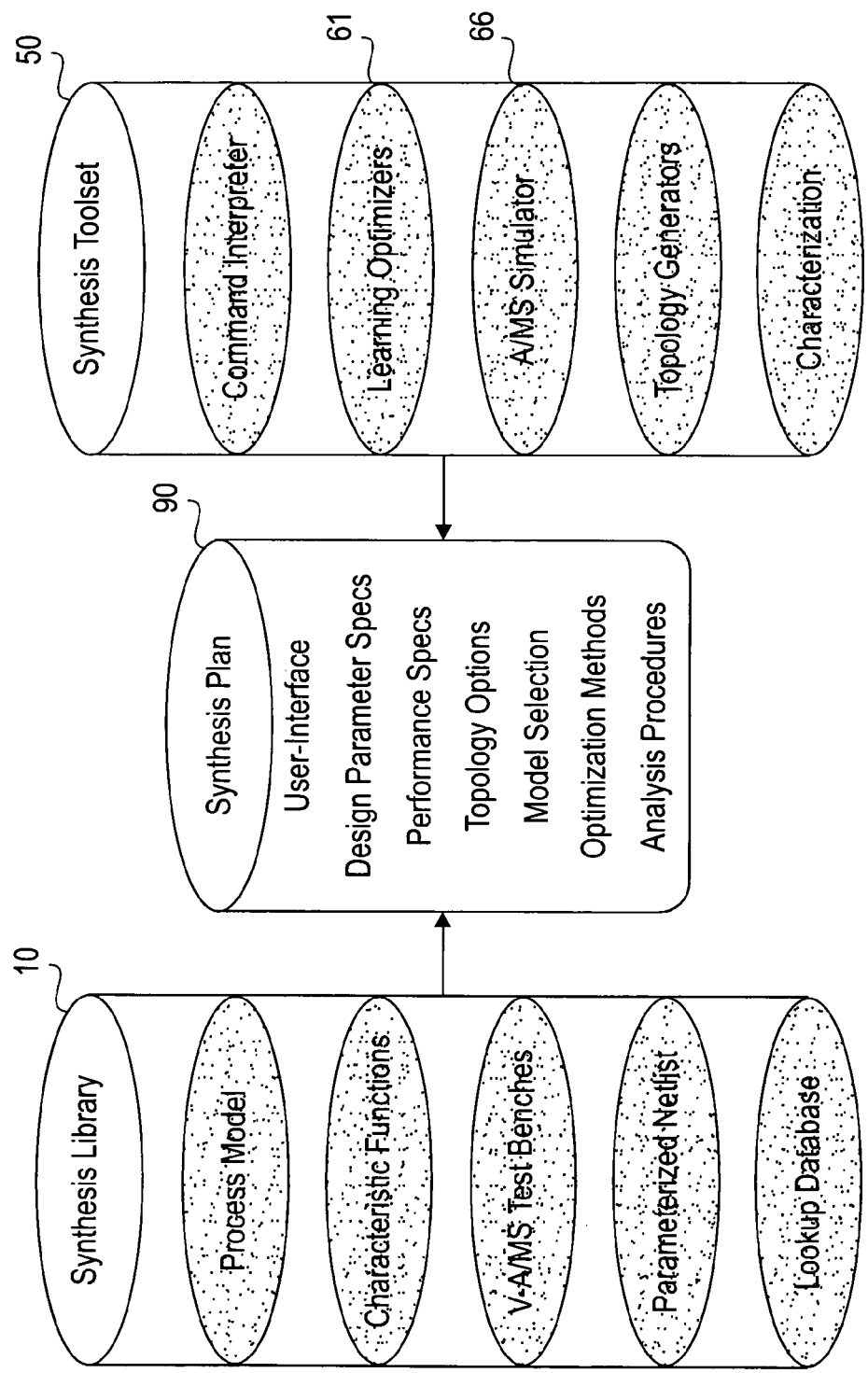
FIG. 1A is an alternate.

Referring now to the drawings, wherein like reference numerals designate identical or corresponding parts, and more particularly to FIG. 1 thereof, there is illustrated a block diagram is a set of related functions that are combined in a mixed-signal development environment according to the present invention. The main components include a Synthesis Library 10; Synthesis Toolset 50; and Synthesis Plan 90.

The Synthesis Library 10 contains cell data, including cell topologies (SPICE netlists), synthesis models of the cells, performance characteristics and design parameters and their characterized limits, simulation scripts, test harnesses, and process files. The present invention provides tools to query and browse the Synthesis Library, as well as to select cells from it.

The Synthesis Toolset 50 is a set of software modules that perform specific tasks. These include optimization, simulation, characterization, and parasitic calculation. The tools are not configured to perform any particular fixed design procedure; rather each can be viewed as a generic black box that performs a particular task. The procedure and order in which these tools are invoked are specified in the Synthesis Plan 90. The Synthesis Plan 90 is the encoded design procedure that when executed invokes the synthesis tools on the cells in a sequence that achieves the complete synthesis of the circuit.

The present invention utilizes Language Controlled Design Flows that allow engineers to specify information that relates to both the formal design description (the 'what' to design) and a description of how to achieve the final implementation (the 'how to' design it). This is distinguished from the traditional design methodology in which formalized languages provide only the specification of the design and do not describe the design process itself.

For example, a traditional design flow treats the definition of a capacitor in an RC Filter identically to the definition of a capacitor in a Charge Pump. This causes degradation in the performance of the simulation of the Charge Pump circuit due to the large voltage swings with short time constants. In this invention, specialized simulation instructions for the Charge Pump circuit can be given that allow the simulator to change the tolerances of the simulator leading to faster simulation without loss of accuracy.

The implementation of this methodology is a set of software programs in which existing designs can be prepared for reuse through characterization, new designs can be developed according to specification through synthesis, and which characterization and synthesis are empowered though high-performance simulation at the behavioral, architectural, device, and layout levels of representation.

In the present invention, the Synthesis Plan 90 utilizes a specialized formal language that encapsulates the knowledge of the original designer about the design component in question (other general purpose languages may also be utilized and programmed according to the present invention). Other programs in the design flow (Optimizer 60, Simulator 65, or other programs/tools, for example) can take advantage of that knowledge. The individual programs/tools within the flow take advantage of the information specific to the design or to portions of the design contained in the Synthesis Plan 90.

There are two classes of users: Plan Authors and Plan Users. The Plan Author is the primary expert designer whose knowledge is to be captured for reuse in a Synthesis Plan. The Plan Author is also responsible for developing the Synthesis Library, which includes developing the synthesis models. He is also responsible for partitioning the circuit block into cells and deciding how to propagate constraints from the block to cells, what order to synthesize the cells, and how to propagate results from cell synthesis to other cells or to the higher level block.

The Plan User is the end user of a Synthesis Plan. He does not need to be an expert designer because he is not interested in how the circuit is designed, but is interested in obtaining a working circuit that meets his performance specifications. Therefore his main activities are in licensing the appropriate plan, specifying the performance specifications, executing the Plan and verifying the results.

The Plan User may or may not have access to the internal contents of the Plan depending on how the Plan is licensed to him. He may be the Plan Author himself in which case he can edit the Plan.

Using the present invention, the designer is able to codify specific information about individual components of the design. Traditional design flows and tools have attempted to provide generalized capabilities that have reduced capability under special circumstances or fail completely to encode the knowledge necessary in these situations. In traditional design flows and tools, the knowledge to optimize a phase-locked loop must be built into the tools prior to use. If the design contains specialized versions of a given type of design component, the tool cannot be easily extended without the original authors of the software program becoming involved.

The present invention provides information external to the software program allows the optimization phase for a PLL to be separated from the basic optimization capability built into the software program. This allows easy extension of capability for special circumstances on a design-by-design basis. Additionally, the ability to change the behavior of the software programs within the design in the field (at a customer site) can be performed either by company personnel or by the customer themselves.

Another benefit of pairing Intellectual Property with Design Flow Process information outside the actual software program is that as new design components are created, their matching design process information can be included with them without changing the end-user's software installation. This also leads to the ability to endow all tools within the design flow the knowledge required to handle new design components.

In the present invention, the design process information is encapsulated into separate Plans. For the synthesis system, a Synthesis Plan encapsulates the knowledge required to synthesize a given design component. For the characterization system, a Characterization Plan exists for each known design component (a charge pump being one example). In the simulation system, simulation control is achieved using the same language that synthesis and characterization plans are written. As additional analysis programs are added to the design flow they can make references to (either by reading or execution of) any other plan.

This latter ability is important because much of what goes on in the synthesis and characterization systems is related to simulation. Thus, the ability to reference or execute each other's plans leads to improved capabilities.

Figure 2:
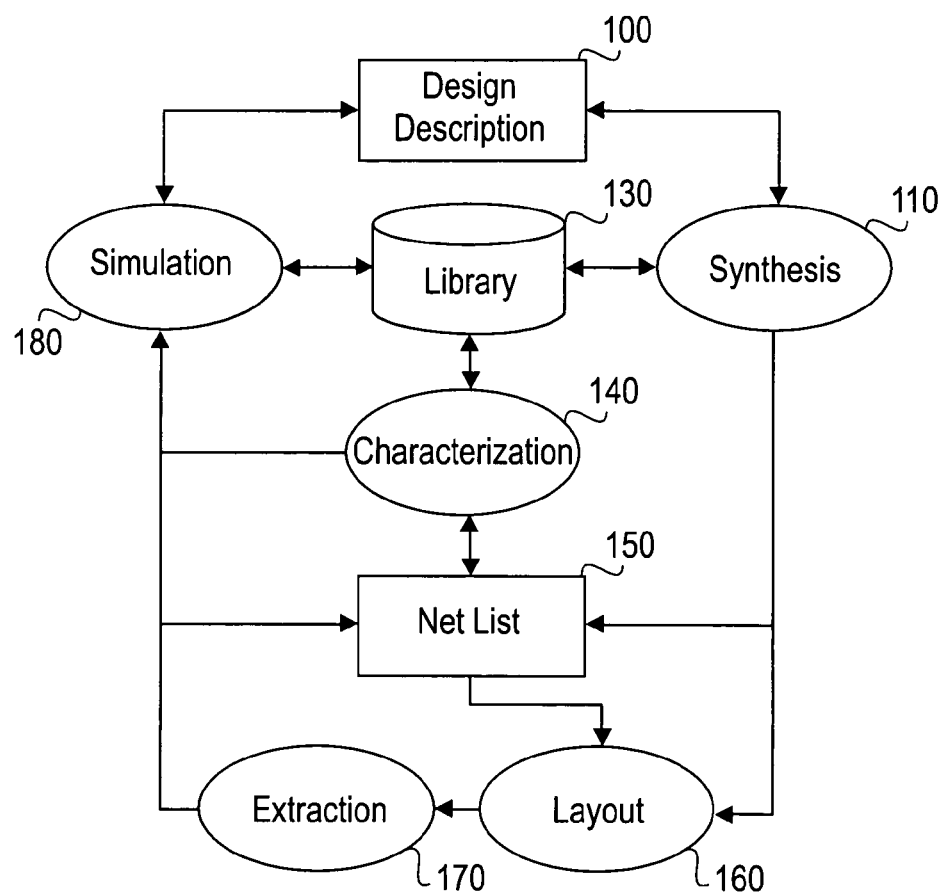
FIG. 2 is a block diagram illustrating a design flow.

Referring again to the drawings, FIG. 2 illustrates a design flow. The basis of the design flow is a Design Flow Specification Language that contains information about how to order the design flow as well as key pieces of information about the various design components that are undergoing translation from representation to representation (from synthesis to netlist to layout, for example).

The design flow in FIG. 2 includes a design description 100, containing an implementation of a design flow specification language programmed according to a device being designed. The design description 100 instructs a synthesis 110 of the device being designed.

A characterization 140 is performed to determine the characteristics of various components of the device. A layout 160 of the device is performed and a corresponding netlist 150 is produced. An extraction process 170 is performed and a simulation 180 of the device is performed. If the simulation results favorably compare to design criteria contained in the design description 100, the device is completed or ready for refinement. During the design flow processes, information about the design is stored in a library 130.

Separating the Plan from the Program:

The present invention, by separating detailed instructions for the characterization, synthesis, simulation, and analysis of a particular piece of Intellectual Property from specific design tools to a Synthesis Plan provides three major benefits.

Increased Performance and Accuracy in Results

Extendibility without Major Rewrites

Reduced Complexity in the Individual Tools

The first of these benefits is derived by being able to build the Plans in a way that can take advantage of the details of the electronic circuit. This allows the author of a Plan the ability to encode the best possible mechanism with which to perform the analysis. For instance, encoding the author's individual knowledge about what is most important during a particular phase of the design flow and the best possible mechanism for implementing it leads to higher performance and accuracy in the final result.

The second benefit allows multiple authors to contribute to the ability of the design flow without requiring changes to the main tools in the design flow. For example, the instructions for accurately determining the timing through a new class of design component can be written in the Design Flow Specification Language. Each design tool in the new design flow can now reference these instructions when required. This extendibility also reduces errors in results due to the fact that the changes to the system are isolated to the particular piece of IP and its plan (how to implement a charge pump, for example), and not to the over all design flow.

The third benefit is derived from the fact that the tool authors no longer need to encode vast amounts of situation specific knowledge into their tools. These changes would be required by the original authors of the tool and would then effect each and every user whether they needed the change or not. This reduces the tools from very large, very detailed, and very specialized programs to more general purpose tool kits that contain all of the pieces required for the analysis, but do not contain the knowledge of when to apply for all possible circuits. This has particular impact in the performance of these new design tools as designers formulate the type of circuits utilized most by their products, not the general market place.

The latter problem can be confined to the plans for a given circuit condition. This makes the individual tools have much higher performance due to the fact that they do not need to test for all circuit conditions; rather, they are instructed, via the plans, when to apply certain analyses.

Figure 3:
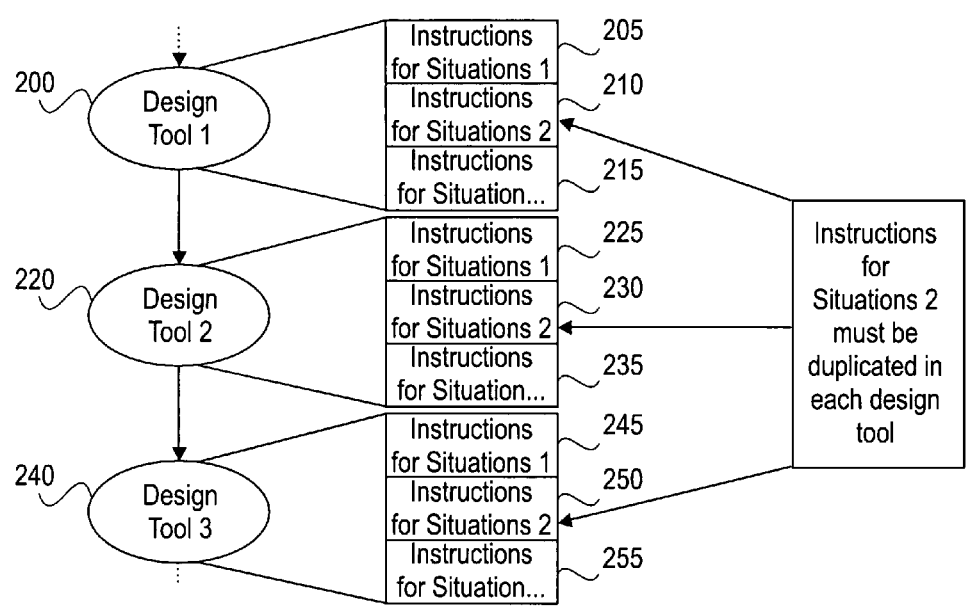
FIG. 3 is a block diagram of design tools and instructions for example situations encountered by each tool.

FIG. 3 illustrates a design flow without the present invention. FIG. 3 illustrates a conventional setting for circuit design having a design tool 1 200, design tool 2 220, and design tool 3 240, each of which have corresponding instructions (design specific information) 205–215, 225–235, and 245–255 respectively. Each design tool utilizes respective corresponding instructions for how to apply the design tool in its part of the overall design. However, if a criteria of the design for a specific situation changes, or if new knowledge about a specific situation is to be implemented into a design, instructions corresponding to that specific situation for each of the design tools will need to be modified accordingly.

However, according to the present invention, the circuit situation specific information can be placed in a single plan and all tools can access it. Thus, if a new situation arises (with the development of a new piece of IP, a new charge pump, for example) then the instructions for each tool can be encoded into the Plan, not each individual tool. These instructions make up a subroutine that is applied only in the event that a particular design component (situation) is included in the main design.

Figure 4:
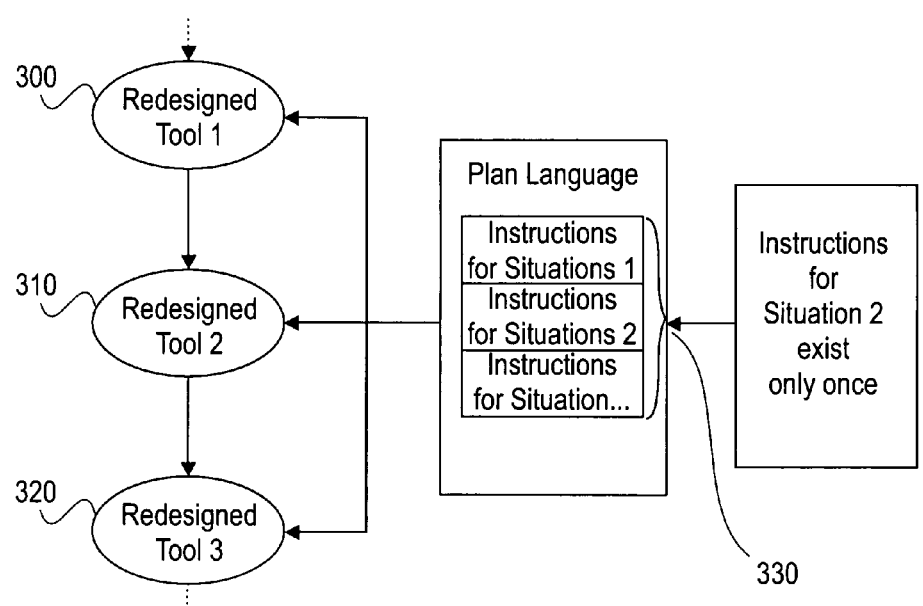
FIG. 4 is a block diagram illustrating a design flow incorporating the master plan and redesigned tools according to the present invention.

In FIG. 4, a redesigned tool 1 300, redesigned tool 2 310, and redesigned tool 3 320 are illustrated. Each of the redesigned tools draw upon instructions 330 for how to apply the redesigned tool for performing its part of the overall design.

Characterization Plans

Characterization Plans embody the information needed to acquire the behavior of a given design component within a specific parameter space.

Information about the Fabrication Process, Operating Voltage Range, Electrical Loading, Temperature, and other user-definable parameters is encoded in the Language which is in turn executed by a Characterizer or Characterization System to perform a characterization (characterization 140, for example) of the given design component, storing its results in a database.

The Characterization Plan monitors and controls the characterization process with the Language while simultaneously storing information for Synthesis and Simulation.

Synthesis Plans:

Synthesis Plans embody the information needed to generate new device-level circuits based on the individual requirements for a given component under design. Thus, the specialized computer program instructions for synthesizing an operational amplifier are encoded in the Synthesis Plan and not in the synthesizer. The synthesizer provides basic tools for pattern matching, optimization, cell selection, and is controlled from the Plan.

Since the process of synthesizing a new device level version of an existing design component requires that the component be pre-characterized, the Synthesis Plan can take advantage of the information stored in the design database and in the Characterization Plan.

The successful synthesis of an analog circuit requires that three tasks be properly executed. These are:

i. Synthesis Library Development;

ii. Synthesis Plan Development; and iii. Synthesis Plan Execution.

Synthesis Library Development generates all necessary data (cell models, measures, test harness) and puts them in the Synthesis Library. This step is performed by the Plan Author. This task has to be executed first.

Synthesis Plan Development is the capture of expert design knowledge into a Synthesis Plan. This phase is expected to be the most knowledge-intensive. This step is performed by the Plan Author. The object of developing a Synthesis Plan is to formally record the design procedure so that it is re-usable when the same circuit is to be migrated to a new technology.

Synthesis Plan Execution is the phase when the Synthesis Plan is interpreted by the Synthesis engine and its commands executed. The user selects the technology, sets the performance specifications and specifies the inputs. This step is performed by the Plan Author or Plan User.

These tasks are described in more detail later.

Simulation Plans:

Another feature of separating design component specific information from the design software product allows the user to specify specialized simulator controls for different design components. This leads to better performance on the overall simulation due to the fact that a given set of tight constraints are localized to a specific design component.

Because of the extensive information encapsulated in the Synthesis and Characterization Plans, the simulator can take advantage of this information to set or control the simulation process based on this information.

Other Analyses:

This invention is not limited to the three tools shown (Synthesis, Characterization, and Simulation) but can be extended to other analysis tools designed to operate within a Language Controlled Design Flow.

Examples:

The following pseudo code demonstrates the ability to encode specific knowledge about a given piece of design IP in a master plan. The example defines specific instructions for the Characterization, Simulation, and Synthesis of the Comparator in a Flash Analog to Digital Converter (FADC).

This example begins with an instantiation of a FADC that will be synthesized into a new design using component specific knowledge (design specific instructions) stored in the reusable Characterization Plan Bias.tst. The specific instructions of the Bias.tst are available, not only for the Characterization Plan, but to any of the design tools (Synthesizer, Characterizer, and Simulator, for example). In this example, the specific knowledge of the Bias.tst is reused twice in the synthesis process and in the characterization process.

```
//
// Synthesize flash ADC from Verilog-A instantiation
//
//   flasha2d #(.fsample(10e6)  .size(4)  .power(100e-3)
.vref(2.0) .vdd(3.3))
//     my_a2d(B1 B2 B3 B4 clk vin vref);
//
flashadc {
    //
    // Select comparators from:
    //
    // compaz              // Single-Stage
    // compaz2             // 2-stage
    // compdiff            // Differential
    //
    // analysis & optimization steps
    //
    simulate compaz        // Select autozeroed comparator
    //
    // Simulation testbench for initial device sizing
    //
    analysis=Bias.tst      // Use the Bias.tst
Characterization Plan
    read Ibias
    optimize {
        target=(vdd*Ibias) < (0.8*power/2^N),
        vars=(wp1, wn1),
        limits(wp1>minp, wn1>minn)
    }
    //
    //  Reverify the Bias Current
    //
analysis=Bias.tst          // Use the Bias.tst Characterization Plan
    read Ibias
    calculate Rtap=(Vref/10e-3)    // Simple characteristic
function
    //
    // Simulation testbench for sampling capacitor sizing
    //
    analysis=settle.tst    // Use  Settling  Time
Characterization Step
    optimize {
        target=tsettle<(0.5/fsample),
        vars=C1,
        limits(0.5e-12 > C1 > 0.1e-12)
    }
    //
    // Simulation testbench for gain bandwidth test, size
adjust
    //
    analysis=gbw.tst       // Use  Gain  Bandwidth
Characterization Step
```

-continued

```
    read gain (F3)
    if (gain(F3) < 10)
        //
        // Change to 2-stage design if AC performance fails
        //
        simulate compaz2
    else
        //
        // Use complete ADC model to confirm performance
        //
            simulate flasha2d
    }
This section is a Characterization Design Tool utilizing the reusable
'Bias.tst' to create a plot of the effect of Voltage and Temperature on bias
current.
//
// Characterization Plan
//
foreach Temperature in ( 0, 25, 50, 75, 100, 125, 150 ) {
    foreach Voltage in ( 2.00, 2.25, 2.50, 2.75, 3.00 ) {
        analysis=Bias.tst          // Use the  Bias.tst Characterization
Plan
    }
}
plot surface "Bias with respect to Voltage and Temperature"
    This section is the reusable Characterization Plan Bias.tst.
    //
    // Bias Characterization Step
    //
    // This routine defines the mechanisms used to measure the
    //   bias point of a comparator
    //
Bias.tst {
    //
    // Instantiate SPICE Circuit compaz.spc for Simulation
    //
    compaz #(.wp1(widthp), .wn1(widthn)) comp1(output, input,
clock, vplus, vmin);
    //
    // Instantiate bias supplies
    //
    vdc #((.dcval(1.65))  vbias(input);
    //
    // Instantiate measurement module
    //
    imeasure #(.dcval(3.3))  ibias(vplus, ground);
    //
    //  Module definition:
    //
    module imeasure(plus,  minus);
        output plus, minus;
        electrical plus, minus;
        parameter dcval=5.0;
        real current;
        analog begin
            branch (plus, minus) supply;
            V(supply) <+ dcval;
            current = I(supply); // Result of measure can be
output to file
        end
    endmodule
    //
    // Vary parameters wp1, wn1 through optimization loop.
    //
    return Ibias
}
```

This example pseudo code is not intended to be either a compilable or executable program or program design language or contain all the features discussed herein, but is illustrative an example of providing specific knowledge regarding a circuit component for a design flow, and reusability of instructions in multiple design tools according to the present invention.

In the previous pseudo code example, it can be seen that the synthesis design tool reuses the bias characterization plan twice. Other design tools, such as the characterization design tool can also use this plan in order to measure the bias current for a given design component (a flash ADC, an operation amplifier, or other) wherever a bias current test is required.

Synthesis Library Development

The development of the Synthesis Library is based on cell characterization with characterization technology according to the present invention. Cell characterization involves a series of steps to analyze a circuit-level netlist for a targeted set of performance characteristics so that a higher level model of the circuit performance is produced.

This model provides an efficient means for evaluation of circuit performance during optimization.

This process involves running pre-specified experiments (multiple simulation runs) to acquire data, analysis, and model generation.

Contents of the Synthesis Library i. Cell Definition

A file listing performance characteristics and design parameters. The file may contain all the performance characteristics and design parameters.

ii. Cell Model

A Verilog-A/MS description of the cell iii. Simulation Script

An AMS script that is used during optimization (when the simulator is called). A set of simulation instructions called during optimization (operation of the MSS engine) to control the simulation.

iv. A Starting Point Table

A table of design parameter vs. performance characteristic points to be used as starting points for optimization.

v. Characterization Plan

Cell Modeling

Developing a model for the cell performs the following:
i. Decide what performance characteristics to be modeled;
ii. Decide what parameters affect what performance characteristics;
iii. Decide how each performance characteristic is to be modeled;
iv. Acquire data necessary for the model;
v. Develop any measurement required for that performance characteristic; and
vi. Generate the parameterized model.

Synthesis Models

The synthesis model of the present invention relates design parameters (the variables that optimization changes) to an observable (by evaluation or by measurement) performance characteristic such as power, gain, slew rate. That is, the synthesis model is 'parameterized'.

The type of model used for synthesis has a strong influence on how fast optimization will be, as well as how accurate the synthesis results will be. Synthesis cell models may be Analytical, Behavioral, and Circuit based. Behavioral models are an abstraction, and analytical models are based on physical models such as MOSFET transconductance, for example.

Both analytic and behavioral models express the relationship between a performance characteristic and the design parameters that affect it as an algebraic equation with the design parameters as the independent variables and the performance characteristic as a dependent variable. Evaluation of that performance characteristic is then a direct evaluation of the equation given the design parameter values.

However, the analytical model is a mathematical expression (e.g., an algebraic equation) that describes the behavior of a circuit in terms of physical characteristics that relate to how the circuit is built. The physical characteristics could be a parameters from device physics for the process there, how the transistors are being made, or design characteristics. The analytic model might be, for example, an algebraic equation, where, some of the variables are physical constants or represent some physical characteristics of the process. Other parts of the equation may be based on a physical model.

For example, A performance parameter for an amplifier circuit might be the gain-bandwidth, represented by the parameter GBW. In a typical implementation of a CMOS opamp, an analytic model for GBW might be:

$$GBW=gm(M1)/(2*PI * Cc) \quad \text{(eq. 1)}$$

$$gm(M1)=sqrt([2*K*W(M1)/L(M1)]* Ids(M1)) \quad \text{(eq. 2)}$$

Explanation of Variables:

gm: MOSFET transconductance;

M1: name of the critical transistor affecting GBW;

PI: 3.1415926;

Cc: the capacitance of one of the components in the opamp circuit;

K: a physical constant derived from the process technology used to implement the opamp;

W: the MOSFET width;

L: the MOSFET length; and

Ids: the current that flows from the drain to the source of the MOSFET.

This model is "analytic" in that it is derived from a direct analysis of a specific implementation of an opamp. The analysis is based on a combination of semiconductor device physics and the laws governing electrical circuit behavior. A complete analytic model for the opamp would start with representing each transistor by its physical model, i.e. a set of equations that describe terminal voltages and currents on the basis of semiconductor device physics and the particular technology in which the device is fabricated.

A network analysis would then be performed, for example by using Kirchof f's laws, until the equations are reduced to the minimum number required to express the desired performance characteristic (GBW in this example). In this example two equations make up the analytic model of GBW. The critical design parameters are L, W, and Cc. The analytic model could be optimized to achieve a specific objective for GBW by adjusting these design parameters.

The analytic model retains the physical parameters that describe circuit and device behavior (e.g. K, gm, Ids). It is developed by analyzing the circuit structure directly. This imposes a limitation in the practical usefulness of analytic models, because it is difficult for a human designer to develop a set of equations for all behavior of an arbitrarily complex circuit. Methods for automating circuit analysis to form analytic models are limited to behaviors that can be expressed by a set of linear equations. Such models are limited to AC, small signal behavior. Sets of nonlinear differential equations are used to model large signal, time domain behavior. This is the basis of circuit analysis programs such as SPICE. Using SPICE in circuit optimization is a slow, compute-intensive process because of the complexity of the models involved, and the requirement that the complete circuit be analyzed at each iteration without regard to the effect of a particular device on the circuit's performance.

In contrast, in a behavioral model, according to the present invention, the actual circuit is analyzed to convert it to this higher level of abstraction where there are no parameters in the model that are tied to any particular process or physical model. They're derived by direct measurement of the circuit, but once it's abstracted all other information on how it was built is lost (not used), whereas in the analytical model it's specifically tied to the process in which it's being built and it's a direct physical model, even if it's an algebraic equation.

For example, in the present invention's method for developing behavioral models for optimization, a circuit is simulated in SPICE once in order to acquire circuit behavior as a function of critical design parameters. The acquired behavior is capable of maintaining the full accuracy of the complex SPICE models. However, once the behavior is acquired, an abstract behavioral model is developed that does not retain any of the physical description of the circuit. The detailed physical model does not need to be solved directly.

By applying general mathematical techniques, such as curve-fitting or construction of tables of circuit behavior, any type of analog circuit can be modeled. The behavioral model that is constructed can be analyzed very quickly, because it only describes the minimal set of parameters that will determine the objective performance to be optimized.

In a more specific example, a circuit simulation gives the terminal I/O behavior and the required performance characteristic is then obtained by measurement of the simulated electrical waveform.

A behavioral model, in some cases, might not produce a waveform. For example, an equivalent of a DC circuit simulation that represents the power of a cell as a function of a set of design parameters. The optimizer would vary the design parameters and the measurement would produce a power result. There is no waveform required.

ii. Circuit-Level Model

This is the parameterized SPICE netlist. Measurements are needed to evaluate the performance. In practice, we expect cell models for synthesis to be a mixture of any of the above. The Verilog-A/MS language is the modeling language—circuit-level models are embedded in the Verilog-A/MS model using the 'language construct'. Hence one unified evaluator (the AMS simulator) is used during synthesis.

Target Cells for One Embodiment of Mss (Mixed Signal Synthesis)

Phase-locked Loop:
  VCO
  Charge pump
  Phase detector
  Low-pass filter

*Sigma-delta A/D Converter:
  Switched-capacitor integrators
  Comparator
  D/A converter Building block circuits:
  Op amps
  Current mirrors
  Voltage references
  Current references MSS Use Model The present invention provides two different use models: one for the Plan Author and another for the Plan User.

Plan Author Use Model

This use model allows the Plan Author to develop the Synthesis Library and to develop the Synthesis Plan.

Library Development

The following are the steps:
1. Parameterized the circuit netlist.
2. Model each performance characteristic in terms of design parameters.
3. Develop the test harness and measurements.
4. Develop the simulation script.
5. Defining starting points for design parameters.

Design Parameters

For each cell, there needs to exist the SPICE-level netlist. This is the primary input. The first step is to parameterize this netlist. All values in the netlist that can be altered during an optimization are represented by symbolic names rather than hard numeric values. Typical examples are transistors' widths and lengths, capacitances and resistances.

Some design parameters may not be optimization variables but are input parameters. An example is the current in a current source in the model, which may be set to different values before different optimizations but remain constant during optimization.

A synthesis plan will specify which design parameters are to be used as optimization variables, and which may be calculated through other means. As an example, an input design parameter such as bias current may result in building a current source that is dimensioned based on process design rules rather than numerical optimization.

An example of a parameterized netlist (design parameters wnb, lnb, ibias, wpdiff, lpdiff):

EXAMPLE 1

```
---------

'language SPICE

.include /usr/tools/antrim/Mss/scl/Models/bsim3/model.typ

.SUBCKT delay_ibias INN INP OUTN OUTP control VSS VDD

+lnb=1u wnb=1.1u lpdiff=0.6u wpdiff=8u ibias=50u

M0 OUTN control VSS VSS NMOS_MOD L="lnb", W="wnb"

+AD=10P AS=4P PD=9.0U PS=3.6U NRD=0.3 NRS=0.3

M1 OUTP control VSS VSS NMOS_MOD L="lnb" W="wnb"

+AD=4P AS=10P PD=3.6U PS=9.0U NRD=0.3 NRS=0.3

M2 tail INN OUTP VDD PMOS_MOD L="lpdiff" W="wpdiff" NRD=0.3 NRS=0.3

M3 tail INN OUTP VDD PMOS_MOD L="lpdiff" W="wpdiff" NRD=0.3 NRS=0.3

M4 tail INP OUTN VDD PMOS_MOD L="lpdiff", W="wpdiff" NRD=0.3 NRS=0.3

M5 tail INP OUTN VDD PMOS_MOD L="lpdiff" W="wpdiff" NRD=0.3 NRS=0.3 ibias vdd tail dc "ibias"
```

.ENDS CELL

'endlanguage

Modeling of Performance Characteristics

After the netlist has been parameterized, the designer decides what the performance characteristics are and develops the model for each performance characteristic.

There are several methods of behavioral modeling for synthesis, including:
1. Polynomial equations;
2. Curve fitting functions; and
3. Tables.

A behavioral model may consist of a set of mathematical expressions that are empirically derived from measurements of circuit response. In behavioral models performance characteristics are expressed as functions of design parameters, through a curve-fitting process as an example.

Behavioral models may also be table based, directly representing a set of sampled points from a characterization of circuit response. The table contains values for performance characteristic measurements (the dependent variables) versus specific values of design parameters (the independent variables).

However, note that analytical equations, as discussed further above, are not equated with behavioral models. Analytical models directly describe the physical behavior of a device as a function of design parameters. Examples of analytical models would be expressions of MOSFET current as a function of terminal voltages, or small signal behavior such as MOSFET transconductance.

Developing the Test Harness

The cell (aka 'design under test' or 'DUT') is instantiated in a module called a 'test harness'. This test harness is a Verilog-A/MS module that includes measurement modules, voltage or current sources and any other modules that are required to simulate the DUT.

An example of a test harness:

EXAMPLE 2

----------

'timescale 100 ps/10 ps

'include "disciplines.h"

'include "connect.h"

module top;
　　electrical ground, inn1, inp1, outn1, outp1, outn2, outp2, vctrl, vdd;
　　electrical outn3, outp3, outn4, outp4, outn5, outp5, outn6, outp6;
　　electrical outn7, outp7;
　　delay_ibias cell1(inn1, inp1, outn1, outp1, vctrl, ground, vdd);
　　delay_ibias cell2(outp1, outn1, outn2, outp2, vctrl, ground, vdd);
　　delay_ibias cell3(outp2, outn2, outn3, outp3, vctrl, ground, vdd);
　　delay_ibias cell4(outp3, outn3, outn4, outp4, vctrl, ground, vdd);
　　delay_ibias cell5(outp4, outn4, outn5, outp5, vctrl, ground, vdd);
　　delay_ibias cell6(outp5, outn5, outn6, outp6, vctrl, ground, vdd);
　　delay_ibias cell7(outp6, outn6, outn7, outp7, vctrl, ground, vdd);
　　delay_ibias cell8(outp7, outn7, inn1, inp1, vctrl, ground, vdd);
　　frequency #(.trig(0.25), .occ(100), .dir(1), .filename ("freq.meas")) meas1(inn1);
　　power #(.ibias(4.951908e−05)) meas2( );
　　vdc_source #(.vdc(5.0)) vvdd(vdd,ground);
　　vdc_source #(.vdc(3.0)) vvctrl(vctrl,ground); endmodule 'language SPICE .subckt vdc_source pin1 pin2 vdc=0 vdc pin1 pin2 "vdc"

.ends

'endlanguage module power;

parameter real ibias=50u;

integer pfile;

real powr;

analog begin
　　@(initial_step)
　　pfile=$fopen("power.meas");
　　@(final_step) begin
　　powr=8*ibias*5;
　　$fstrobe(pfile, "power %e", powr);
　　$fclose(pfile)
　　end end endmodule The DUT is called 'delay_ibias' (description shown in Example 1). The vdc_source modules are voltage sources that sets values for the supply and ground. The module 'power' measures the power consumption given the bias current.

Developing the Simulation Script

When the optimizer finds a solution, it calls the AMS simulator to simulate it to evaluate the performance characteristics. The simulator is called with a simulation script containing the AMS commands to be executed during each simulation. These are:

i. Set instance parameters to their values by specifying:
　　set_inst_param("top.cell1", "lnb", $lnb);

There should be one such command for each design parameter. The actual numeric values assigned to these variables are found by the optimizer which automatically generates the assignments and sends them to the simulator.

ii. Set simulator options, such as
　　set_simparam("modopt", 0);

iii. Specify a simulation analysis such as
　　tran(1n,40n,0,0.1n);

Defining Starting Points for Design Parameters

A starting point is a set of design parameter values defining a point in the solution space which the optimizer uses as the initial solution. This can be specified by the user with the 'set_opt_param' command.

In one embodiment, only a plan developer is allowed to set a starting point for design parameter values. A plan user would not have visibility of the design parameters, and would never directly execute set_opt_param. When new process technologies are applied to an existing plan, the limit and step values are changed appropriately.

For an initial value, the user specifies the lower and upper bounds on the parameter as well as the minimum step size, which is the smallest value the optimizer may alter this parameter by. The minimum step size represents a stopping criterion.

set_opt_param (<param_name>, <llim>, <starting_point <ulim>, <min_step_size>);

This command is explained in specifying a starting point in Section 4 (also see <starting_point> in set_opt_param).

Synthesis Plan Development

A Synthesis Plan may be implemented as a script in the Perl language. The Plan Author 'codes' his design knowledge directly in the language, making use of the control constructs and synthesis commands provided.

Via the present invention, MSS can also be used to perform optimization on a single cell. The decision to select a particular cell topology or a cell model is made by the designer. Commands are available to traverse a design hierarchy, optimizing each cell in turn and using the results from a particular cell as the starting point or as inputs to the optimization of another cell.

Synthesis commands are used to perform operations that collectively make up a Synthesis Plan.

In the following, commands are shown in "short-hand" mode.

List Available Libraries

An MSS installation may contain any number of cell libraries. The user can list all the libraries that have been installed.

Synopsis:
list_libs

Description

Relative to the Antrim home $ANTRIM, the cell libraries available are searched and listed, with a description of each library.

Example:
MSS> list_libs
ANTRIM=/usr/tools/antrim
Synthesis cell libraries installed at $ANTRIM/Mss/libs:

| Library name | Version | Description |
|---|---|---|
| pl1_cell_lib | v1.0b | Cells for phase-locked loop. |
| fa2d_cell_lib | v1.2c | Cells for flash A2D converter |
| ds_a2d_cell_lib | v1.0a | Cells for dual-slope A2D converter |

Selecting a Synthesis Library

The Synthesis Library is organized in the following hierarchy: library, function, cell. A library contains functions. Each function may have many different topologies, or models associated with it—simply called 'cells'. To synthesize a cell, a Synthesis Library, a function and a cell must be selected. This command allows the user to select the Synthesis Library.

Alternatively, other library organizations may be utilized, for example, a hierarchy of library, cell, view (views are alternate representations of a specific cell, for example, a behavior synthesis model view or a circuit model view of a cell).

Synopsis:
set_lib <char *libname>

Description

The user selects a Synthesis Library out of the list of libraries.

Example:
MSS> set_lib pll_cell_lib
Current cell library: 'pll_cell_lib', version v1.0b.
Path: /usr/tools/antrim/Mss/libs/pll_cell_lib Showing the Current Selected Library The user can query what the currently selected Library is.

Synopsis:
show_lib

Description

The system displays the current value of the Library setting.

Example:
MSS> show_lib
Current cell library: 'pll_cell_lib', version v1.0b.
Path: /usr/tools/antrim/Mss/libs/pll_cell_lib Listing Available Functions in the Selected Synthesis Library A function is an entry in a Synthesis Library representing a circuit class, such as op amps, VCOs, filters. A function may have several different topologies, or different models. Having selected a Synthesis Library, the user can list the available functions in it.

Synopsis:
list_funcs

Description

All the functions in the current library are listed, with a description of each. The current Library must be set.

Example:
MSS> list_funcs
Current cell library: pll_cell_lib
Path: /usr/tools/antrim/Mss/libs/pll_cell_lib

| Function | Description |
|---|---|
| vco | Voltage-controlled oscillator |
| pfd | Phase/frequency detector |
| lpf | Low-pass filter |

Selecting a Function

The user selects the function using this command.

Synopsis:
set_func <char *function name>

Description

Sets or overwrites the current function setting.

Example:
MSS> set_func vco
Current function: 'vco', version v1.0
Current cell library is: pll_cell_lib
Path: /usr/tools/antrim/Mss/libs/pll_cell_lib Listing the Available Cells Having selected the function, the user can list all the available cells under it.

Synopsis:
list_cells

Description
Lists the available cells in the current function.

Example:
MSS> list_cells
Current function: vco
Current library: pll_cell_lib
Path: /usr/tools/antrim/Mss/libs/pll_cell_lib/vco

| Cell Name | Description |
| --- | --- |
| vco_80 | 80 Mhz voltage-controlled oscillator |
| vco_200 | 200 Mhz voltage-controlled oscillator |

Selecting a Cell
Having selected a function, the user can now select a cell for synthesis.

Synopsis:
set_cell <char *cellname>

Description
Sets or overwrites the current cell.

Selecting a Process
The set_process command is used to select the technology process.

Synopsis:
set_process <char *processname>

Description
Selects a technology process and sets or overwrites the current process.

Example:
MSS> set_process tsmc_018
Current process is: 'tsmc_018', version v1.0

Path:
/usr/tools/antrim/Mss/libs/pll_cell_lib/vco/vco_80

Listing Available Processes
Available processes can be listed with the list_procs command.

Synopsis:
list_procs

Description
All the process models in the current installation are listed, with a description of each.

Example:
MSS> list_procs
Process models installed at: /home/fred/cvs/MSS/scl/Models

| Process Model | Version | Description |
| --- | --- | --- |
| cmos07 | v1.0 | Process model for cmos 0.7 micron |
| tsmc_018 | v1.0 | Process model for tsmc 0.18 micron |

Setting a Design Location
A design location is the directory to which results are to be stored.

Synopsis:
set_design <char *designname>

Description
Sets or overwrites the current design. The current working directory is changed to the new design directory.

Example:
MSS>!!pwd
/home/fred/work/nakamichi
MSS> set_design stage1
Design path: /home/fred/work/nakamichi/stage1
MSS> set_design /home/user/working
Design path: /home/user/working Changing to the Current Design Location
The current design location is where results will be written to. It is necessary to 'go to' that location. This is done with the 'go_curr_design' command.

Synopsis:
go_curr_design

Description
Change directory to the current design location.

Example:
MSS> set_design stage1
Design path: /home/fred/work/nakamichi/stage1
MSS> go_curr_design
MSS>!!pwd
/home/fred/work/nakamichi/stage1

Showing the Current Design Location
The user can query what the current design location is with the show_design command.

Synopsis:
show_design

Description:
Show the current design.

Example:
MSS> show_design
Design path is: /home/fred/work/nakamichi/stage1

Saving the Current Design
Synopsis:
save_design <char *tar_file_name>

Description
Compresses and saves the design in the current design directory to the archive file specified by tar_file_name. An "mss_design_settings" file will be created and included in the archive for later use in verifying version correctness when restoring the design. See "restore_design" below.

Example:
    MSS> save_design test.tar
    Saved design: /users/fred/nak/stage1 to file: test.tar Restoring a Saved Design Synopsis:
    restore_design <char *tar_file_name>

Description
    Restores a previously saved design whose archive is in tar_file_name. The design is restored to the current directory. If the design references library items whose versions are not current, the restore will fail. Upon restoration, the current design will be set to the current directory.
    Example:
    MSS>!!pwd
    /users/fred/nak/stage1
    MSS> restore_design test.tar
    Restored design from: test.tar to /users/fred/nak/stage1

Optimization
    The present invention provides a very versatile way of specifying performance constraints and goals. The user can choose a particular optimization objective: maximize, minimize or meet a specific goal (i.e. an equality constraint) for a given performance characteristic. He can specify a target ('goal') or just specify limits that describe a range. That is, any solution found within the range is a usable solution. A range may be unbounded at one end to support minimize and maximize objectives. For the maximize objective, the lower limit is required and the upper limit is not applicable. For the minimize objective the upper limit is required and the lower limit is not applicable. For a 'goal' objective, both limits are required.
    The optimizer works at two effort levels: HIGH or LOW (see Running Optimization).
    At HIGH level, the optimizer tries its best to meet the goal, if one is specified. If the goal is not specified and the objective is minimize, the first solution found below the upper limit is returned. If the objective is maximize, the first solution found above the lower limit is returned. If the objective is an equality constraint, the optimizer considers the midpoint between the limits as the goal.
    At the LOW effort level, the optimizer disregards the goal if one is specified. For a maximize objective, the first solution found above the lower limit is returned. For a minimize objective, the first solution found below the upper limit is returned. For a goal objective, any solution found between the limits is returned.
    Finally, each performance spec has a 'weight'. This is a number from 0 to 1 that tells the optimize how to prioritize among multiple performance specs. The weight determines how much each performance spec contributes to the overall cost function. The overall cost is a weighted sum of individual cost components, one for each performance spec.
    The optimizer seeks to obtain an overall zero-cost solution. A zero-cost solution represents the optimum solution—it is one that meets all the specified constraints. For a 'HIGH' effort level, if a goal is specified for a particular performance spec, a solution that meets that goal contributes zero to the overall cost. Deviation from the goal towards the limits increases the cost linearly. Going outside the limits penalizes the cost component by a factor of 1E6. If the goal is not specified and the objective is maximize, the first solution above the lower limit contributes zero cost. If the objective is minimize, the first solution below the upper limit contributes zero cost. If the objective is 'goal', the midpoint between the limits contributes zero cost.
    For a 'LOW' effort level, if the objective is maximize, a solution above the lower limit contributes zero cost. If the objective is minimize, a solution below the upper limit contributes zero cost. If the objective is 'goal', a solution between the limits contributes zero cost. See FIGS. 4A–4D, for example illustrations.

Setting Performance Specifications
    The set_spec command is used to specify a performance spec:

Synopsis:
    set_spec <perf_char> <objective> <llim> <goal> <ulim> <weight>
    where:
    perf_char: (char *) name of the performance characteristic
    objective: (char *) type of optimization (min, max, or goal).
    llim: (char *) lower limit
    goal: (char *) goal
    ulim: (char *) upper limit
    weight: (char *) weighting of this item in cost function
    Note: lower limits are either strings representing valid floating point numbers or are set to undefined with "-".

Description
    Sets an individual performance specification for optimization. The user specifies all parameters. Violation of the following
    will generate warnings:
    <llim> should be greater than or equal to the minimum value defined in the cell definition.
    <ulim> should be less than or equal to the maximum value defined in the cell definition.
    For goal optimization, both <llim> and <ulim> should be set. If a goal is defined, it is between <llim> and <ulim>.

Example:
    MSS> set_spec trise min 1.2E–10 5E–10 19E–9 0.75

Specifying a Starting Point
    One of the best ways for enhancing the speed of optimization is to specify a good starting point for the optimizer. A starting point is a set of design parameter values. To specify a starting point, each design parameter value is specified separately with the set_opt_param command. Besides the starting point, the user, who in this case is the plan developer also specifies what the lower and upper limits are, as well as the minimum step size that the optimizer is allowed to vary the parameter by.

Synopsis:
    set_opt_param   <param_name>   <llim>   <guess> <ulim><min_step>
    where:
        param_name: (char *) name of the design parameter
        llim: (float) lower limit
        guess: (float) starting point
        ulim: (float) upper limit
        min_step: (float) minimum step size Description:
    Sets an individual device parameter for optimization. The user specifies all parameters. The following rules will apply:
    The initial guess must be between the min and the max if they are specified.

Example:
    MSS 206> set_opt_param MN1_W 1 2 3 .000000002
    Setting optimization parameter:

| Name  | Min | Guess | Max | Min Step   |
|-------|-----|-------|-----|------------|
| MN1_W | 1   | 2     | 3   | .000000002 |

Running Optimization
  The 'optimize' command runs the optimizer:
Synopsis:
  optimize [options]
  Run optimization with specified options.
  Options are:
    —effort [low|high] Specify the computation effort.
Plan User Use Model
  The Plan User executes the following tasks:
  i. Select a Synthesis Plan
  ii. Sets performance specifications
  iii. Executes the Synthesis Plan
Executing the Synthesis Plan
  The command to execute a Synthesis Plan is the 'do' command. The Plan is specified as a script to the 'do' command:
Synopsis:
  do <script>
Description:
  Execute the given script in MSS.
Example:
  MSS> do plan
  . . . . runtime messages from plan execution Mixed Signal Synthesis Engine FIG. 5 describes a synthesis engine according to the present invention, including a data flow between a MSS Learning Mode Optimizer 520 and a simulator 580, which illustrates part of what the synthesis plan controls.

Figure 5:
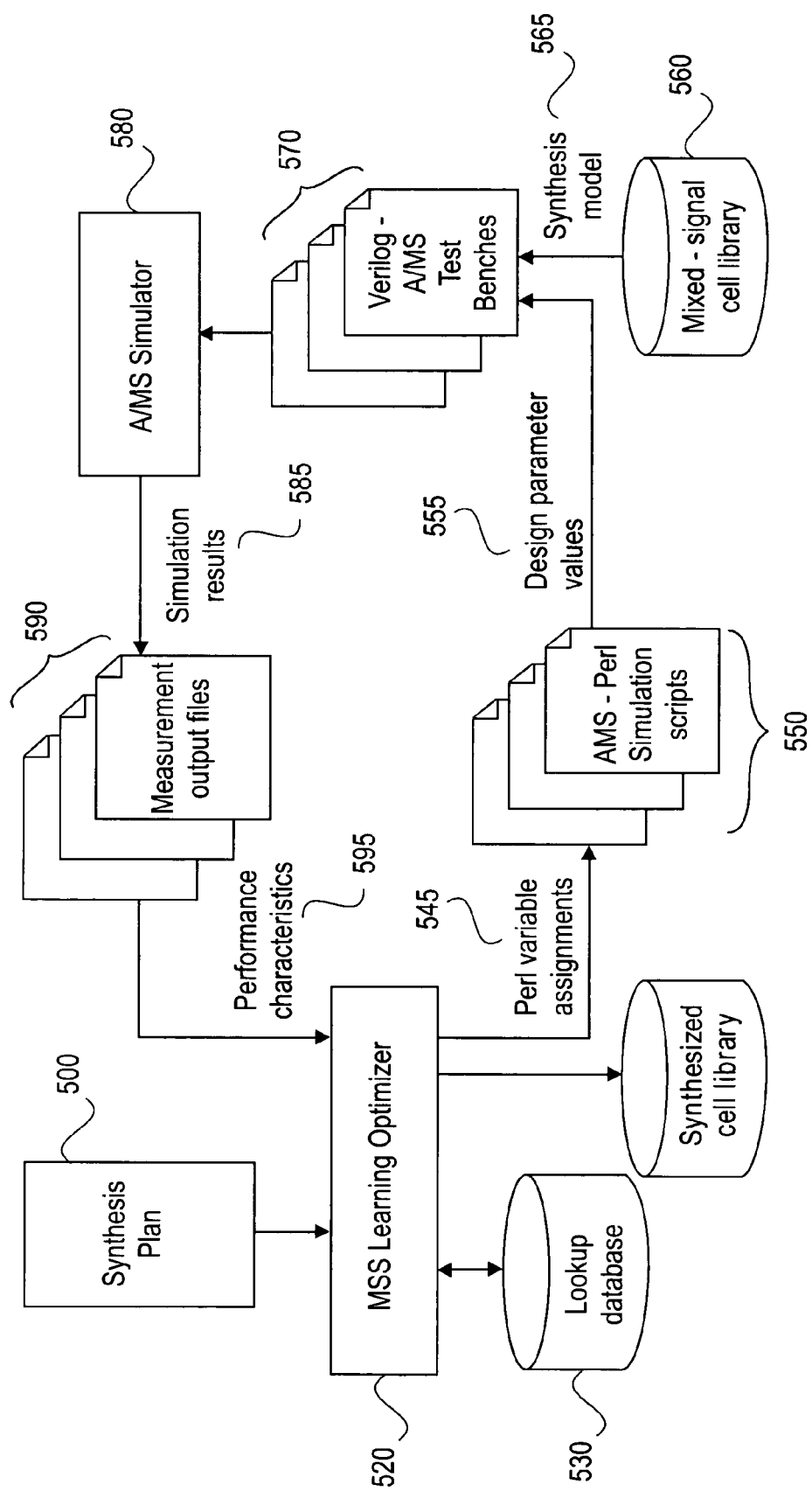
FIG. 5 is a block diagram of one embodiment of a mixed signal synthesis engine according to the present invention.

A synthesis plan 500 sets out rules for the optimization process. The optimization process operates on a model, which is stored in a reference library along with plans and other data (see also 10, FIG. 1, for example). In FIG. 5, the plan is represented as a linear flow, but may have branches and subprocesses. The plan encapsulates knowledge for synthesizing a given design component and for the synthesis process. Part of the plan is to set up rules for optimization, part of the plan is to specify what component in the library is to be operated on and to set the criteria for what performance is to be achieved.

Once set up and specified, the optimizer runs the plan by passing the values of design parameters to a model. The model gets simulated with an AMS simulator 580 and it has its results measured and passed back to the optimizer (performance characteristics 595). Thus, the processes includes a loop that the design is put through, each loop recording results which pass from the MSS Learning Optimizer to the lookup database. When it is completed and the results have been achieved (or with each iteration of the loop), the lookup database, which is the learning mode portion of the invention, has increased in size and has additional reference points for future runs of the MSS engine.

The lookup database is the collection of things that have been learned by optimizing a particular design. The MSS engine has taken a certain type of circuit and exercised with a lot of different values for design parameters and achieved different levels of performance in the process. Information related to those different levels of performance is stored in the lookup database. Subsequent runs for a same cell do not have to go through the same loops because the information is looked up as needed.

In one embodiment, each user creates his own synthesized library 540. If the user is given write access to the lookup database, his optimization process (running the MSS engine) provides learned data to the lookup database corresponding to simulations performed during that optimization process. So, if one individual user pulls this plan out of the library, and runs it, providing a set of performance specifications. Later, the same or another user calls up that same plan, gives it a different set of performance specifications, and the plan takes advantage of the fact that the cell in that plan has been operated on before by reading things out of the lookup database 530.

The lookup database 530 is part of the reference library. It is built on over time. The MSS learning optimizer writes a database or reads from a database when a user sets various options to tell it to learn or to tell it to look up.

The PERL variable assignments 545 are a mechanism for allowing the optimizer to pass parameter values into a synthesis model to be simulated. In one embodiment, both the MSS engine and the AMS simulator use the PERL language as their control layer. A number is passed into a PERL script and attached to a synthesis model which is then simulated with the AMS Simulator.

The test benches 570 provides a test environment in which the circuit is simulated. The test bench provides operating conditions, such as temperature, input voltages, etc., that are attached to the model being synthesized. In addition, the test benches provide the information needed to perform a particular measurement. In one embodiment, each test bench is built for a particular measurement and a particular type of circuit.

The simulations script provides the parameters (design parameters of the circuit being synthesized that are within the design and how they can be changed) and sets up ranges for the test bench. Then, the simulator runs the test bench. The mixed signal cell library provides the circuit representation that you're trying to synthesize. The cell library contains the circuit without any information on how to apply it to a particular application, what we refer to as parameterized. All of its design variables have not been assigned values yet. After being pulled out of a library, MSS assigns values to those design parameters, for the circuit being synthesized.

The synthesis model 565 can be any type of model (synthesis model, behavioral model, etc.). But regardless of what form it takes, the synthesis model 565 basically is used to map the function of a design variable to a performance parameter. For example, when synthesizing an amplifier, you might have a performance parameter of the gain of that amplifier. The model that you want to operate on provides what design parameter(s) influence that performance. So, the design parameters can be dimensions of transistors, it can be value of bias current somewhere in the circuit, whatever a designer would sit down and adjust in order to make that circuit meet that specification of performance. As discussed herein, in a behavioral optimization model, this is done in a more direct way. Alternatively, the model could be a circuit model that's down to the detail of the spice netlist. The basic process is to pull a model out of the library, and that model gets the design parameters in order to achieve a certain level of performance.

In one embodiment, topology selection is performed to examine the performance of different implementations of that VCO in order to choose the best one. The Mixed Signal Synthesis Engine of FIG. 5 is not restricted to one particular model. But once a model is selected the process of going around the loop would be performed for that particular implementation.

The simulator 580 is the device for making the measurement, it runs whatever is provided to it. The test bench 570 provides how the circuit is configured in order to make a particular measurement. For example, if you're looking for a gain of an amplifier you need to hook up the right instruments by signal and measure certain signal out and run calculations to determine what gain is. How that gets performed is different than how the amplifier would be configured to measure its power. The test benches describe all these various configurations and how to make a measurement, including information for the simulator on how to run the test bench. The simulation scripts 550 provide instructions to take a model, apply specific parameters, hook it up a specified way, and provide facilities to make specified measurements, then, provide it all to the simulator 580 and let it run.

Figure 6:
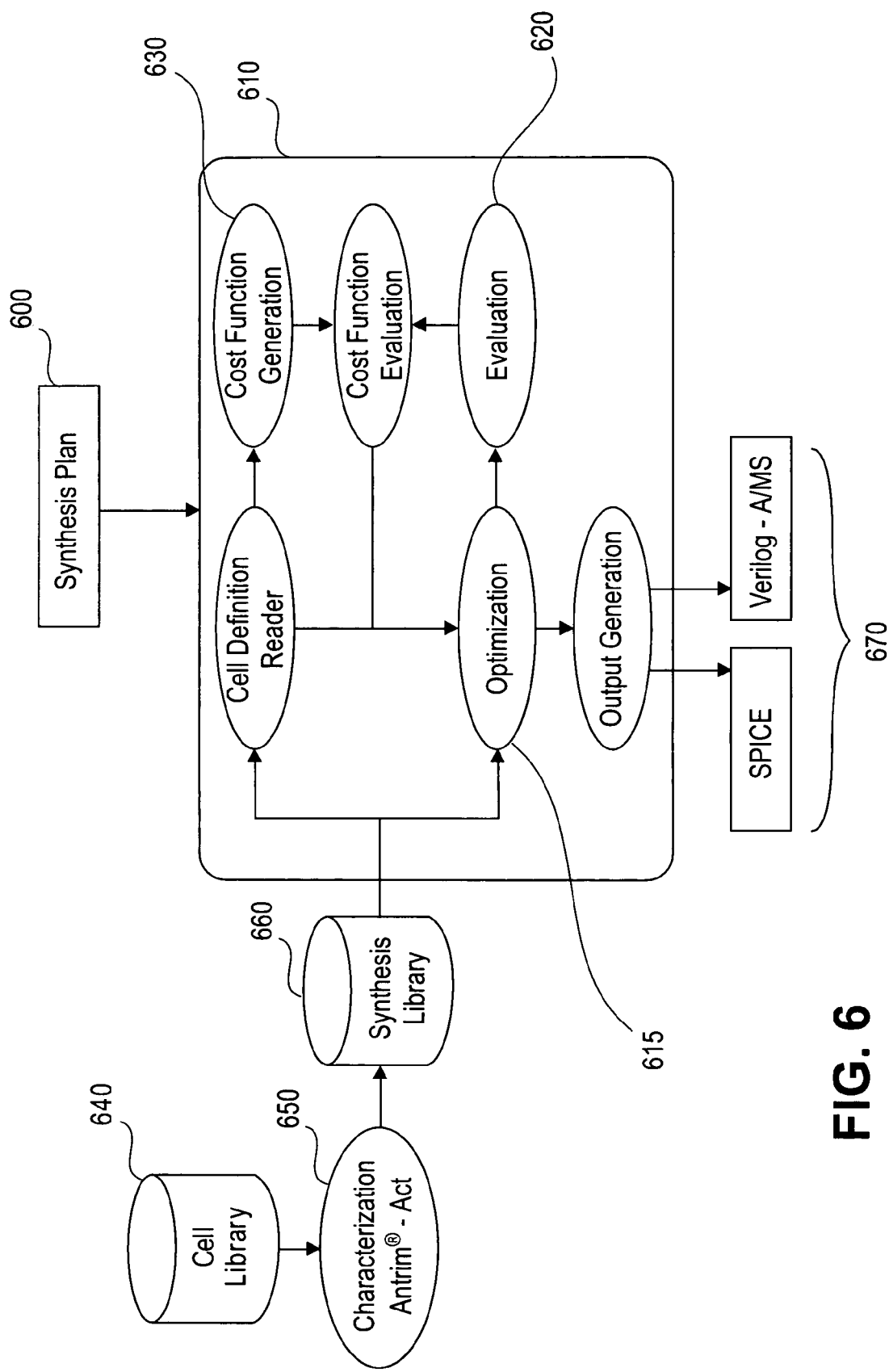
FIG. 6 is a block diagram of another view/embodiment of a mixed signal synthesis engine according to the present invention.

FIG. 6 illustrates a simplified engine 610. A synthesis plan 600 is provided to the engine 601. The engine 610 includes an optimizer 615, an evaluation module 620, and cost function modules 630. Again, the process is controlled by the synthesis plan, and is based on taking a model from the cell library 640, applying design parameter values and evaluation, including cost analysis, to provide an output in either SPICE or Verilog formats.

MSS Output

In the present invention, MSS produces the following output:
  i. A sized netlist in SPICE or Verilog-A/MS;
  ii. AMS simulation script for verification; and
  iii. The actual performance specifications for the synthesized circuit in datasheet form.

In the present invention, MSS also estimates device parasitic(s), not just capacitances, and can do resistance also. Capacitances given the design rules and the sized devices.

Figure 7:
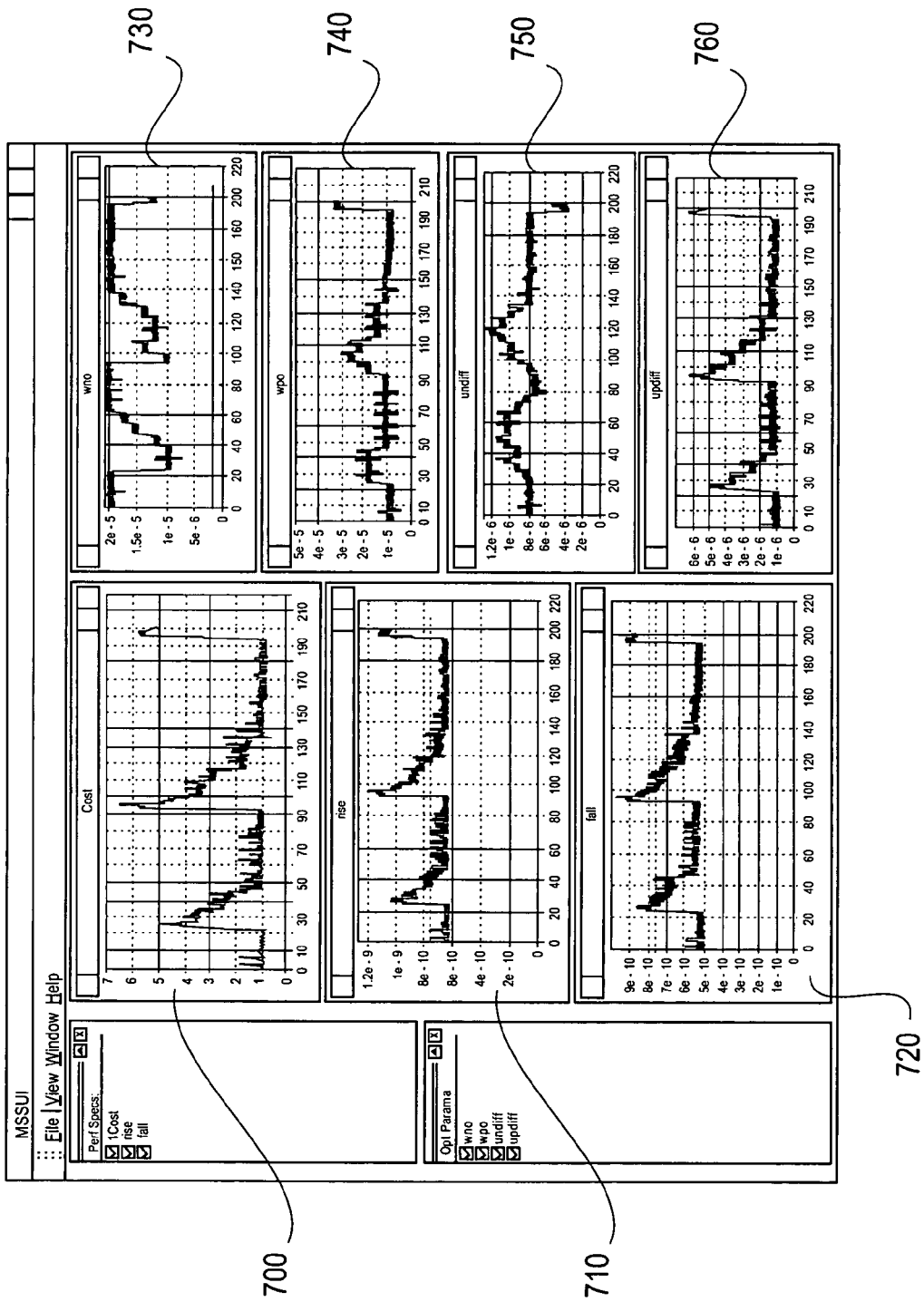
FIG. 7 is a screen shot of one embodiment of a user interface for viewing results of the present invention.

FIG. 7 illustrates an example output of the processes performed by the MSS engine. The output provides for monitoring a snapshot during the various stages of circuit synthesis. For example, cost chart 700 provides a look at how close a circuit being synthesized is to achieving goals established for that circuit. Each point in the graph represents a complete synthesized circuit. In this example, the circuit cost is shown as approaching 1 during several time intervals. In an ideal situation, the cost would approach zero, because the further a circuit is from desired objects, it is at a higher cost.

As the various iterations are performed, the cost chart 700 displays some large jumps, where the cost increases (spikes) to a high cost level. This represents decisions made by the optimzer to change the parameters being modified by any of a larger amount, in a different direction, or to vary different parameters, or vary any quantity in the circuit synthesis process to see if better results can be achieved by iterating to a solution from a different set of values.

For example, in one embodiment the model being used for synthesis may be changed after a predetermined number of iterations through the MSS Engine synthesis loop, or the model may change after a close solution is found. In the latter case, a less computationally intensive model may be used to get close to a solution, then a more accurate model is selected for determining a final circuit configuration.

Any of circuit parameters and characteristics may also be displayed in the output, including, for example, rise 710 and fall 720 times, wno 730, wpo 740, wndiff 750, and wpdiff 760. For clarity, each of the circuit parameters and characteristics are displayed on same scale. The process of gathering the data and outputting the display includes 1) Identifying circuit parameters and characteristics for display, 2) Retrieving the circuit parameters and characteristics, 3) Formatting the circuit parameters and characteristics for display, and 4) Outputting the parameters and characteristics. In one embodiment, the parameters and characteristics are retrieved after a complete simulation of each circuit. In other embodiments, a predetermined number of simulations are performed before gathering the output data. Displays of other formats, including the same or different sets of parameters and characteristics (other than those shown in FIG. 7), may also be utilized.

Behavior Models for Circuit Design Optimization

In one embodiment, the present invention utilizes behavior models for circuit design optimization. The following is a description of the invention in a limited example describing the processes of the invention for a voltage controlled oscillator. As will be apparent to those skilled in the art, these processes are applicable to all types of analog circuits and may be modified or varied within the scope of the present invention as described herein.

Figure 8:
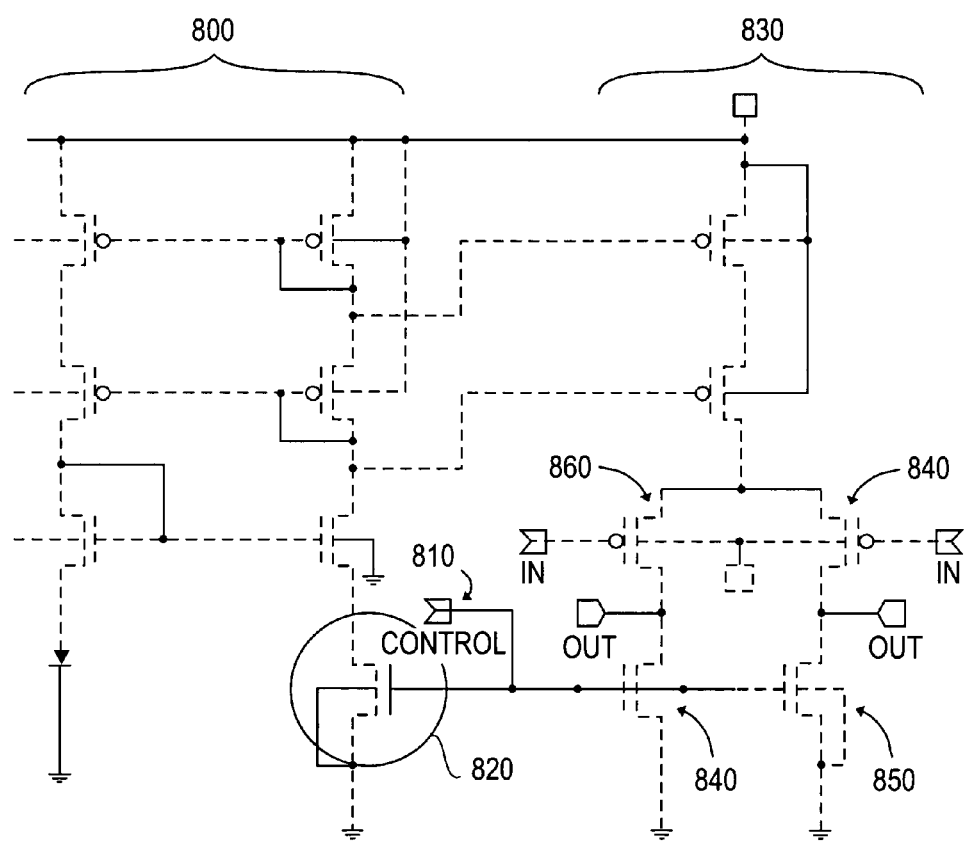
FIG. 8 is a circuit diagram of an example of a synthesizable VCO to be synthesized according to the present invention.
Figure 9:
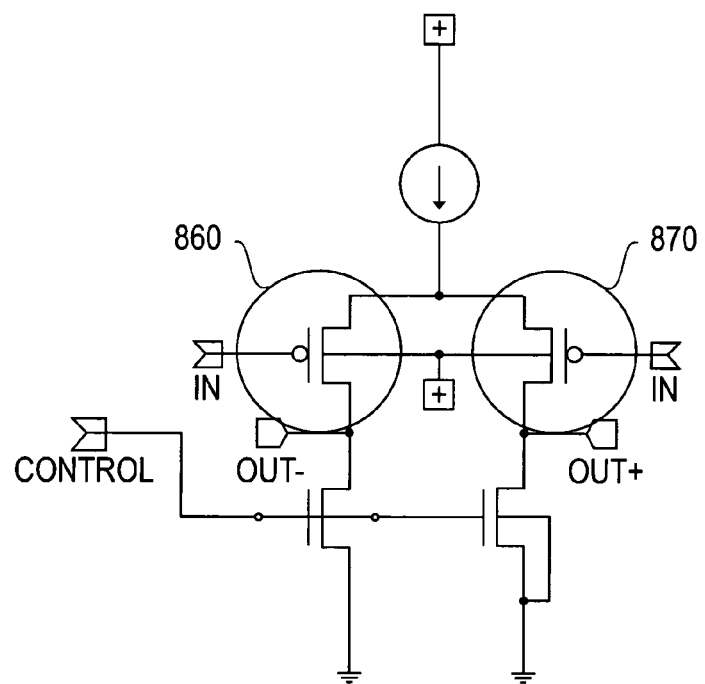
FIG. 9 is an enlarged view of key transistors for the synthesizable VCO.
Figure 10:
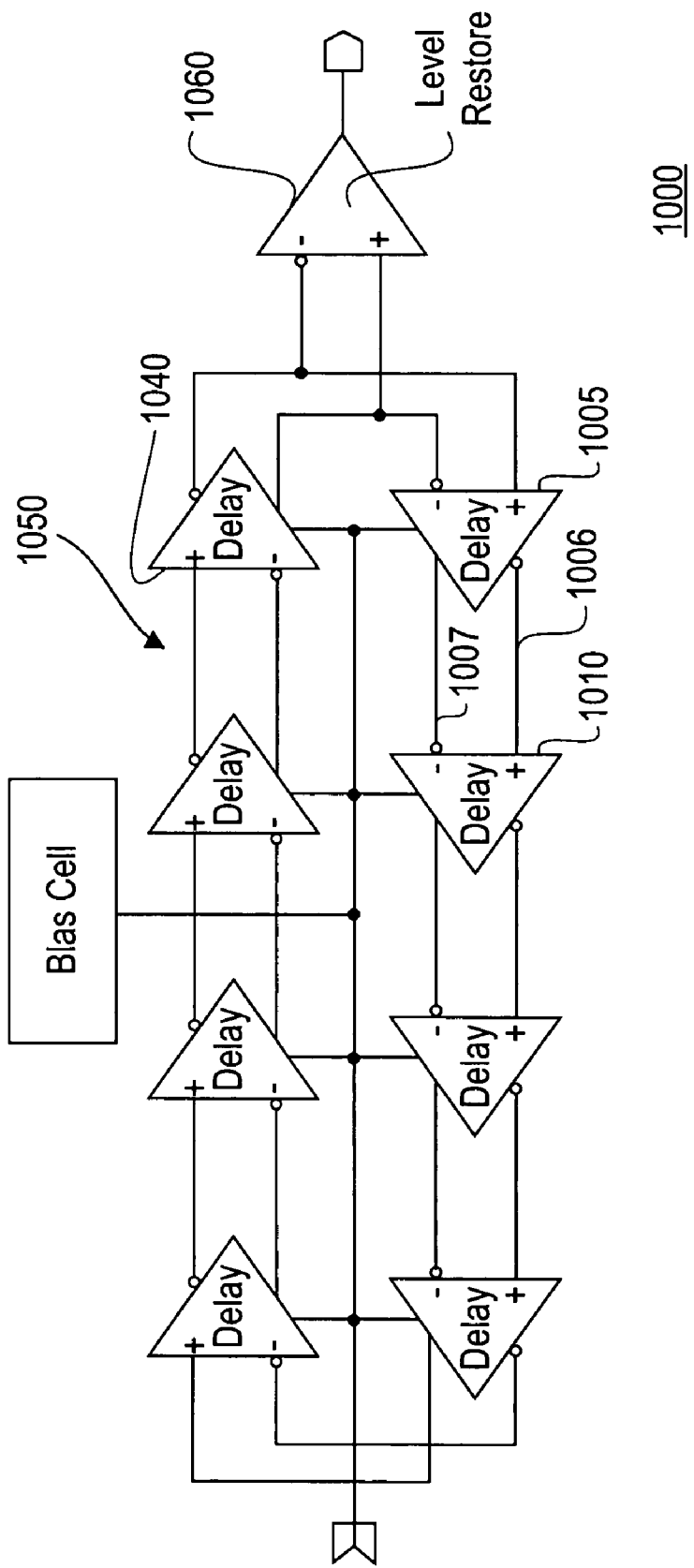
FIG. 10 is a block diagram of a VCO that is synthesizable via the present invention.

FIG. 8 shows a simplified schematic for a portion of a voltage-controlled oscillator. The design is composed of two functional blocks, the bias control circuit and a differential delay cell. The differential delay cell is also depicted in FIG. 9. The delay cell in this example consists of six transistors. In a complete oscillator configuration (see FIG. 10, for example) there would be several delay stages (1005, 1010, etc.) connected to form a ring 1050, where the outputs of one stage (e.g., output 1006, and output 1007 of delay stage 1005) connect to the inputs of another delay stage (1010, for example), until the last stage 1040 connects back to the input of the first (delay stage 1005) and a level restore stage 1060. For the proof of concept example, eight stages consisting of a total of forty-eight transistors make up the ring oscillator 1000.

The performance of this circuit is established by selecting the values of the essential design parameters so that objectives for total power dissipation and oscillation frequency are met. Power dissipation is controlled by the eight-transistor bias generator circuit in FIG. 8. FIG. 8 is a combination of a bias generator and one cell of the VCO. The cell is 830. The essential design parameters of the bias cell are the dimensions of the highlighted transistor, enclosed within the circle in FIG. 8. Once the goals for power dissipation are established, the oscillation frequency is primarily determined by establishing the dimensions of the highlighted transistors in FIG. 9.

To perform a design optimization on this voltage controlled oscillator circuit, analysis would typically be performed by using a circuit simulation program such as SPICE.

This would require solving the model equations for all forty-eight transistors in the ring oscillator 1000, plus the eight components (> transistors and one diode, 800) in the bias control circuit of FIG. 8.

The results of a number of simulations of oscillator frequency for various settings of the design parameters produce simulations for the circuit. Simulations must normally be done at many of these various settings before an optimum set of values is found. This can require many iterations and a large amount of simulation time. In addition, when a new set of performance objectives are specified the entire process must be repeated.

Figure 11:
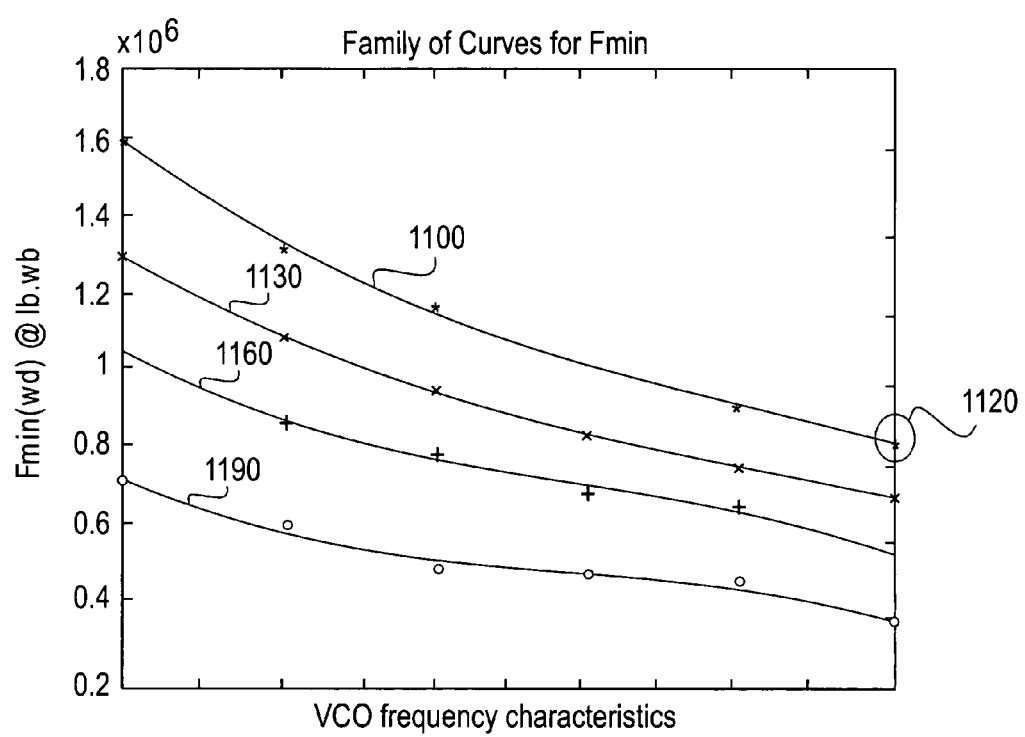
FIG. 11 is a graph illustrating several simulations that represent behavioral models according to the present invention.

The present invention utilizes a method of developing behavioral models for optimization, and eliminates the repetitive simulations of transistor models. This is accomplished by capturing the results of simulating a design once, and converting the circuit behavior to a model which can be analyzed much more efficiently. One example of this procedure is shown in FIG. 11, where curves are drawn through the data points produced by the SPICE simulations. These curves are produced by performing a mathematical fitting operation, to convert the characteristic behavior of the circuit to a polynomial expression. In this example the expression will describe the variation in the oscillator frequency that results when the width of the critical transistors in the differential delay cell are adjusted.

For a third order behavioral polynomial, the expression would be:

$$F_{osc} = a_3{}^*W_d^3 + a_2{}^*W_d^2 + a_1{}^*W_d + a_0 \quad \text{(Equation 1)}$$

This polynomial expression can be solved directly by an optimization algorithm, without requiring any simulation of transistor models. In another implementation of the behavioral modeling method, the data points in FIG. 11 can be captured directly, and stored in a table. In this technique, the polynomial expression is not formed directly, and interpolation between data points is used to increase the precision of the model.

Referring again to FIG. 8, there is illustrated two vertical strings of transistors (on the left half of FIG. 8) that make up a bias cell 800, and down towards the bottom is a control input 810 that goes to the left into a bias control cell 820, and it also goes to the right into a delay cell 830.

In this example, these two circuits are separately optimized since the one on the left (800) is basically a DC circuit that just sets the power level and the one on the right (830) is actually one of the cells in an oscillator that would connect to several of those in the loop, into the ring oscillator 1000 discussed above, for example.

So as an example, this circuit has various types of performance depending on the power that a designer might want and can afford to dissipate, and what frequency of oscillation might be wanted to be achieved (presenting the optimization problem of trying to minimize the power while maximizing the frequency). Optimization is performed by adjusting the sizes of the transistors. An expert designer's knowledge of this circuit or through a process of analysis it is determined that in the bias cell 800, only one transistor (bias control cell 820) controls the current and that's the transistor that has the control input 810. Therefore, the sizes of the other transistors are not critical to this optimization problem.

In a conventional optimization for the above-described circuit a designer would take the whole thing and either adjust all the circuits elements simultaneously if values had not already been established or the designer would have to pick them. But, in any case, the designer would be simulating the whole circuit. The present invention only adjusts the circuit element or elements (bias control cell 820 in this example), identified by the expert, which illustrates one way that the present invention models the performance of the circuit.

The delay cell 830 is more complicated, it gets a control input that's common to the bias control cell 820 and, of course, that controls the power because basically you have similar transistors that have that common input. But current that flows through the delay cell will also be used to drive an input of a subsequent cell. So adjusting the control input 810 and adjusting the size (the physical size on the chip or technology) of the two input transistors, 860 and 870, modifies both the power and the frequency simultaneously for that cell. So that's a more difficult optimization problem.

The effect of the sizes depends on the circuit. This is where the analog designer spends his time. Not only coming up with the circuit but what the sizes, dimensions, should be and how the device gets laid out.

Looking again at transistor 820 (bias control cell 820), if that transistor is made longer, the power goes down and, if made wider, the power goes up. Power is an example of a quantity that would be optimized if the designer were just looking at power. Looking closer at the other two transistors (860 and 870) in the delay cell, they are in the circuit as an input so they present a certain capacitance that needs to be charged up and down as the oscillator oscillates back and forth. In that case, the designer would know that if the width of that transistor is increased, then the capacitance of that transistor is also increased. Therefore, the size of that transistor needs to be controlled, to tune the oscillator. If the current is a fixed quantity, be, then the designer fixes an amount of current that will be charging or discharging a variable amount of capacitance, and the frequency of the oscillator is determined by that relationship. The size of this transistor needs to be selected to get the frequency that needs to be achieved.

The size parameters are input into a SPICE simulation. The SPICE provides an initial characterization, either to build a table or to make measurements. Each point on the graph in FIG. 11 is generated with SPICE and represents one spice simulation. Each line represents a behavioral model that covers all of those points simultaneously with one equation.

The analog synthesis process of the present invention is based on having the MSS program automatically figure out the sizes of these transistors (820, 860, and 870, for example). The designer doesn't know before he starts what they should be to achieve the desired performance. One approach for the designer would be to try and pick some values and manually adjust them until he gets something close to the desired result. Alternatively, values close to the desired result may be used to run an optimization program in an attempt to adjust them. However, many time-consuming manual adjustments or a lot of compute cycles are needed to figure it all out.

In the present invention, the curves represent different levels of power and different levels of frequency (power and frequency characteristics). For example, any one of those lines in FIG. 11 represents varying the width of those transistors over a certain range. For example, giving the X axis range of wd=6μ–18μ would vary the dimensions of the transistor from 6 microns to 18 microns. The designer wants a certain frequency but doesn't know how big the transistor should be to achieve it. So the graph, in effect, varies the dimensions of the transistor from 6 microns to 18 microns and shows what effect it has on the oscillation frequency.

Looking at the top most curve, curve 1100, at 6 microns it shows a 1.6 data point 1110, that's 160 MHz. Over to the right where it would be 18 microns, it shows something right around 1 at data point 1120, a little over 100 MHz is produced. So for that particular set of dimensions, the designer may vary the width of that transistor from 6 microns to 18 microns, the oscillation frequency changes from 100 MHz to 160 MHz. If a designer wants 120 MHz, or 150 MHz, he doesn't know. The circuit designer could do a rough analysis or he could actually run the simulations to get a more accurate calculation or estimation of what the dimensions should be to achieve the desired frequency.

The present invention takes the circuit, characterizes it, by running the device dimensions over a certain range of allowed sizes. Once that is done, it doesn't have to be done again. The characteristic has a certain shape to it and an equation can be made that duplicates it.

A curve fitting algorithm can be used to represent the kind of relationship provided by the starred data points (1110 and 1120, for example). An equation such as equation 1 would be referred to as a third order polynomial because it has three terms in it that relate that value, the width, the wd in equation 1 is the wd that was varied in the simulations. FIG. 11 illustrates the starred points, each one of those is a measurement from a simulation. The curve of FIG. 11 is plotted by running those same and other values of wd through equation 1, and drawing the line that would result. The curve goes pretty close to all the starred data points.

This process is a combination of characterization and modeling, because the process of capturing those data points would be characterization. The process of converting them to an equation that duplicates that characteristic is modeling. The process takes the performance (characteristics) of a circuit and converts them to a model that's represented by an equation.

The present invention is not doing approximations, it is actually calculating and developing functions that represent the actual behavior that has been measured from an actual circuit or measured from the simulation. Preferably, more points gives a better curve, but at a minimum of probably three. Two points always gives you a straight line (which may be acceptable for some circuits) and how many are actually used is under the judgment of the person that's doing it. Alternatively, the software could specify a minimum number of points (three, for example).

Lines 1130, 1160, and 1190 in FIG. 11 represent other dimensions in this circuit that are important. In this case, the bias control transistor 1120 dimensions are varied so we get a different curve for the oscillation frequency, depending on the selected dimensions of transistor 820. So this becomes the total characteristic for the circuit illustrated in FIG. 8. There's three variables that we have here. The length and width of the bias control transistor 820, and the length and the width of the transistors 860 and 870 (but for purposes of the example, their lengths are fixed and only their width is varied). So it provides a total of three design variables that we can adjust for example purposes.

In this case, the graph could have been drawn as a three dimensional surface because a family of curves is present. The only axis that you see is the width axis but implicit in each of those curves is a pair of values for the width and length of the bias control transistor 820 as well. So you could have had three axes where one was width, and one was length of one transistor, and one was the width of transistor 820. Other combinations and graphs representing these and other dimensions are also contemplated.

In the example, the optimization is first run on the transistor in the bias circuit which provides two of the three needed values, which are used to pick which curve is used for the last transistor.

Stated differently, each one of the curves in the graph would represent a different set of the A3–A0 parameters in equation 1. A different set of A3, A2, A1, and A0 parameters (coefficients) are associated with each set of values for the length and width of the first transistor.

The curve is selected, and the values for the curve are first determined by picking the sizes of the transistor. This is done by optimizing its dimensions for the power. The transistor controls the power of this circuit so it is sized in order to choose that result first. Once known, we know what the coefficients of the curve are for the other equation.

A feature of the present invention is that the design uses the model and doesn't care where the model came from. When looking at the equation (model) the designer doesn't know anything about the circuit it depicts. It is referred to as a completely behavioral model not physical in any way, and has been derived from behavior measured during characterization. The models others have used have always had some physical representation of what the circuit was doing and the transistors that made it up. Their equations would have physical parameters of the device. A physical model like the transistor equations that SPICE uses, for instance.

Figure 12:
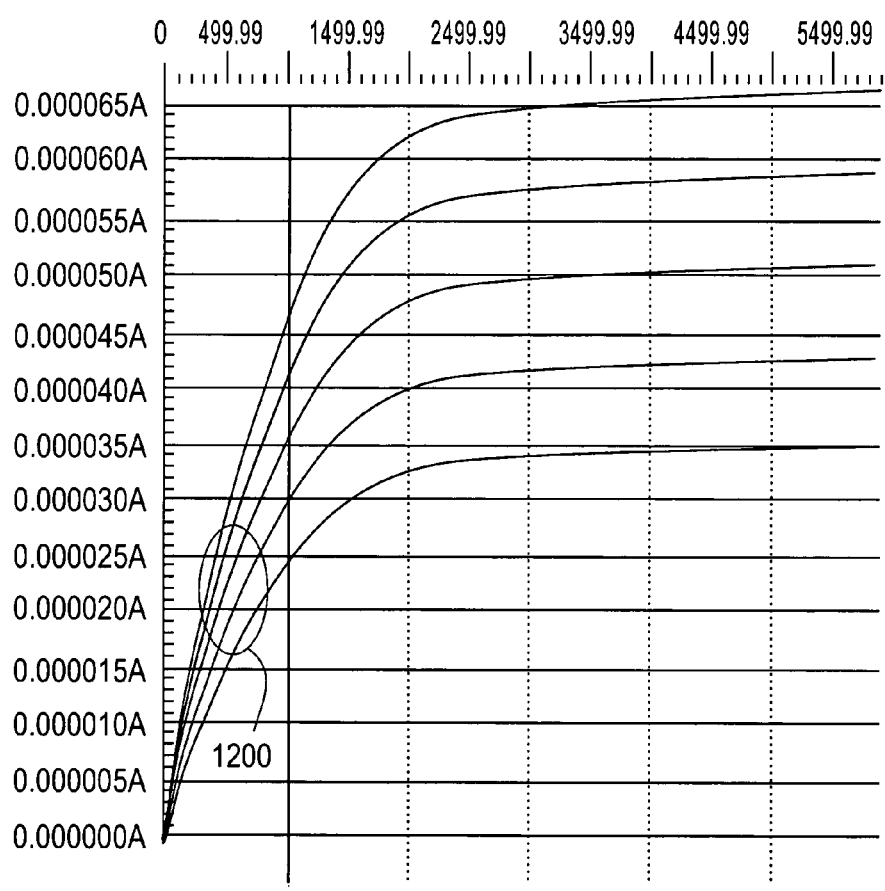
FIG. 12 illustrates initial characterization graph that represents the kind of measurements that will be made in picking the size of a bias control transistor.

FIG. 12 illustrates initial characterization, and is a graph that represents the kind of measurements that will be made in picking the size of the bias control transistor 820. In the characterization process, the present invention generates those kinds of curves and measurements automatically. By showing curves 1200, it demonstrates the characterization side of this process. The circuit is characterized and its behavior is measured to build a model. The above discussion addresses this process by mentioning that a lot of SPICE simulations would be used normally, and then discusses the modeling process and how the model is used.

Figure 13:
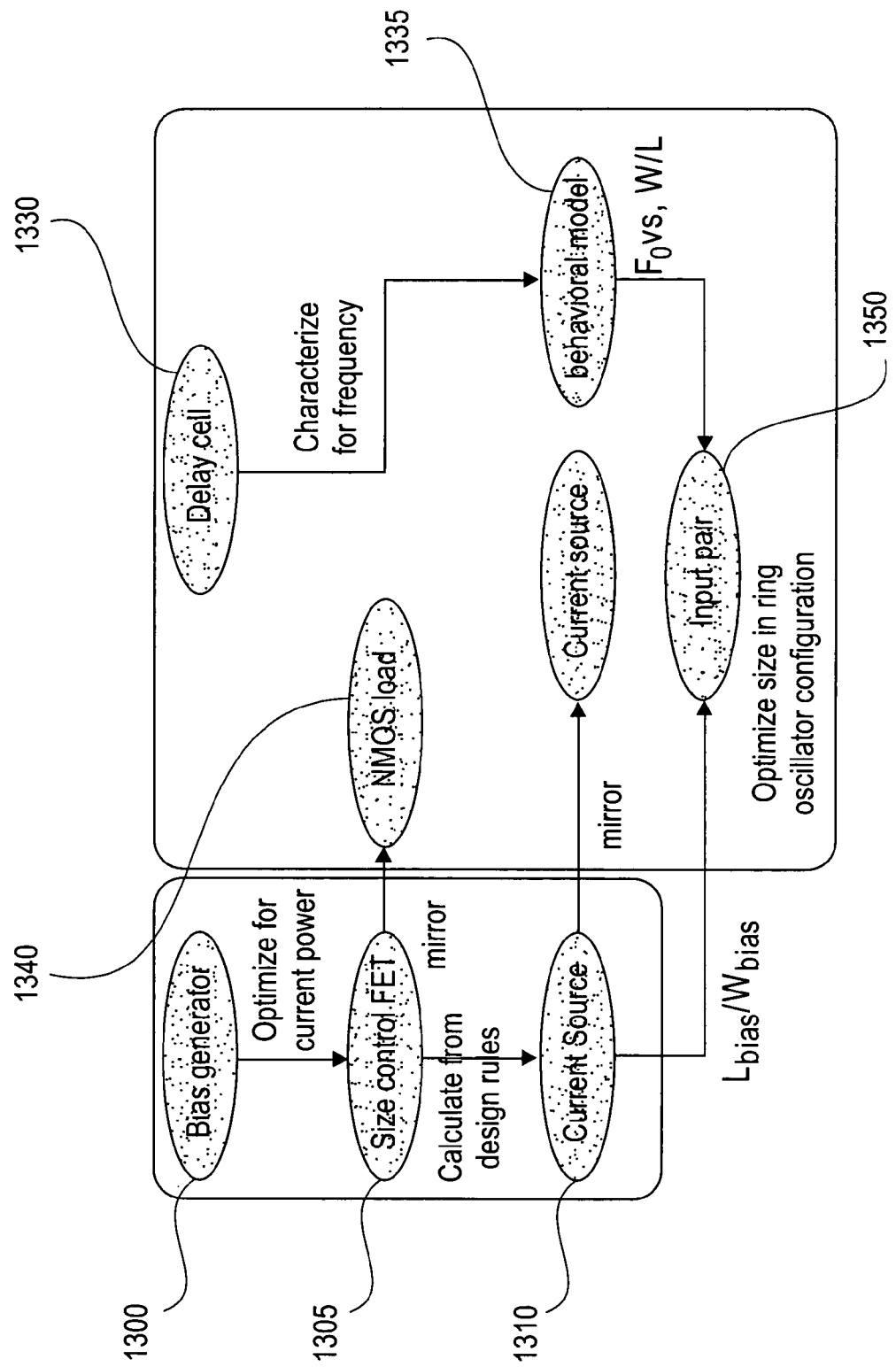
FIG. 13 is a bubble diagram of steps in an example synthesis flow for an oscillator according to the present invention.

FIG. 13 takes another look at the overall MSS system, illustrated as a flow diagram of how the MSS software would work to implement these processes, starting by representing the two cells as 1300 and 1330 (representing the bias and delay cells discussed above). The oscillator circuit is split into two separate cells 1300 and 1330, and the MSS software works on each one somewhat individually.

The first step 1305 is to come up with dimensions for the control transistor (i.e., the bias generator cell 1300, representing the bias control cell 820, for example). An objective of the MSS software is to build up this entire circuit so that when completed, a user has dimensions for all the transistors and the circuit works according to the specification that was set for it. The flow diagram/bubble charts of FIGS. 13–16 depict the steps that would be executed along the way in building up that circuit (lightened bubbles designate completed steps).

At various points models are used rather than actually simulate the whole circuit, and that's where the behavioral models (polynomial equation 1, for example) for optimization come in. The MSS methodology is to characterize the circuit and develop the models so that later on when a designer wants to synthesis the circuit for a certain level of performance, he goes back and reuses those models, rather than needing to reuse the whole circuit again. The "characterize for frequency" flow from delay cell 1330 points into a behavioral model 1335, which is the model used rather than simulation.

Figure 14:
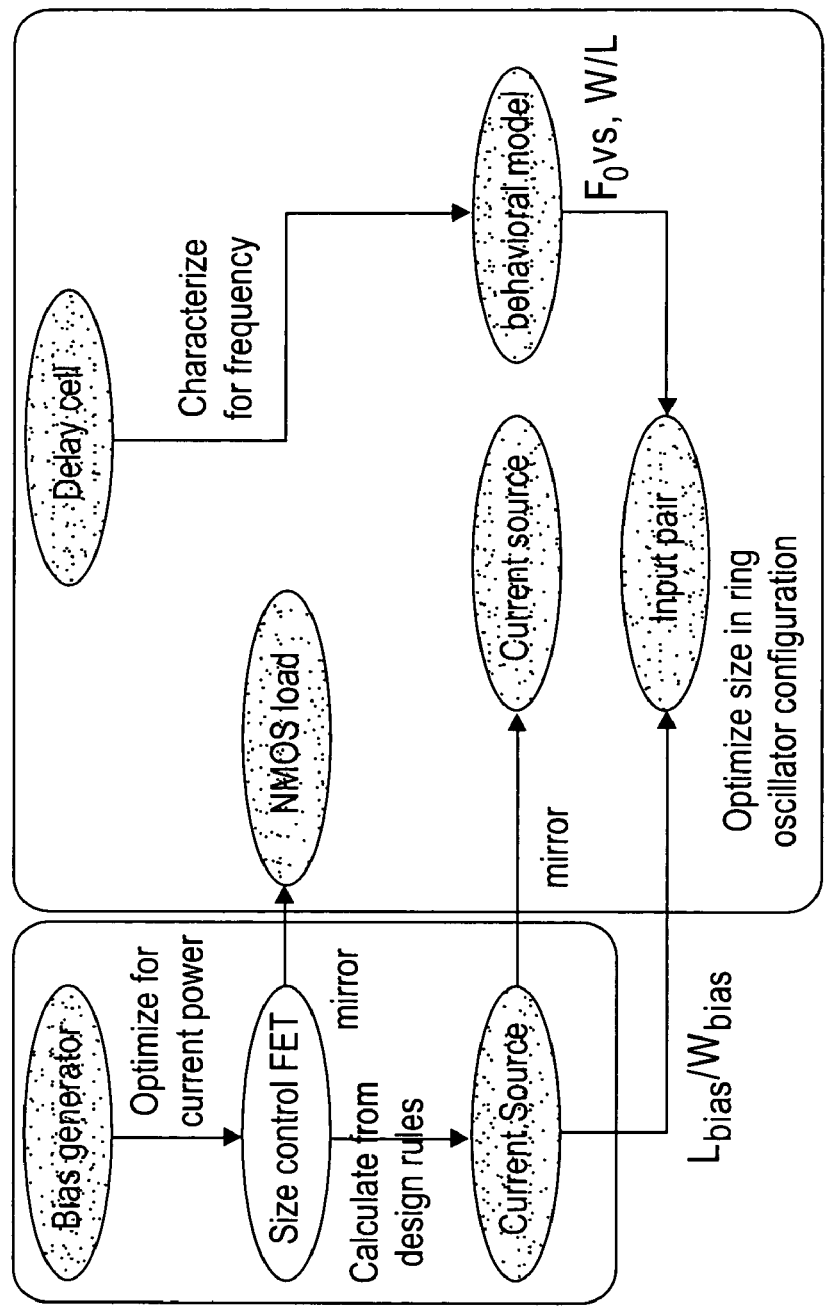
FIG. 14 is a bubble diagram of steps in an example synthesis flow for an oscillator according to the present invention.

For example, the polynomial equation 1 is the behavioral model for that circuit so that equation is used during synthesis to come up with dimensions for the transistors. Using that model, we come up with what the dimensions should be, then we plug them back into the circuit, rather than have to use the circuit the whole time. So step 1, note FIG. 14, is size control FET 1305, basically figures out what the size should be. Leading into that bubble it says optimize for power, so the size is selected for optimal power.

Figure 15:
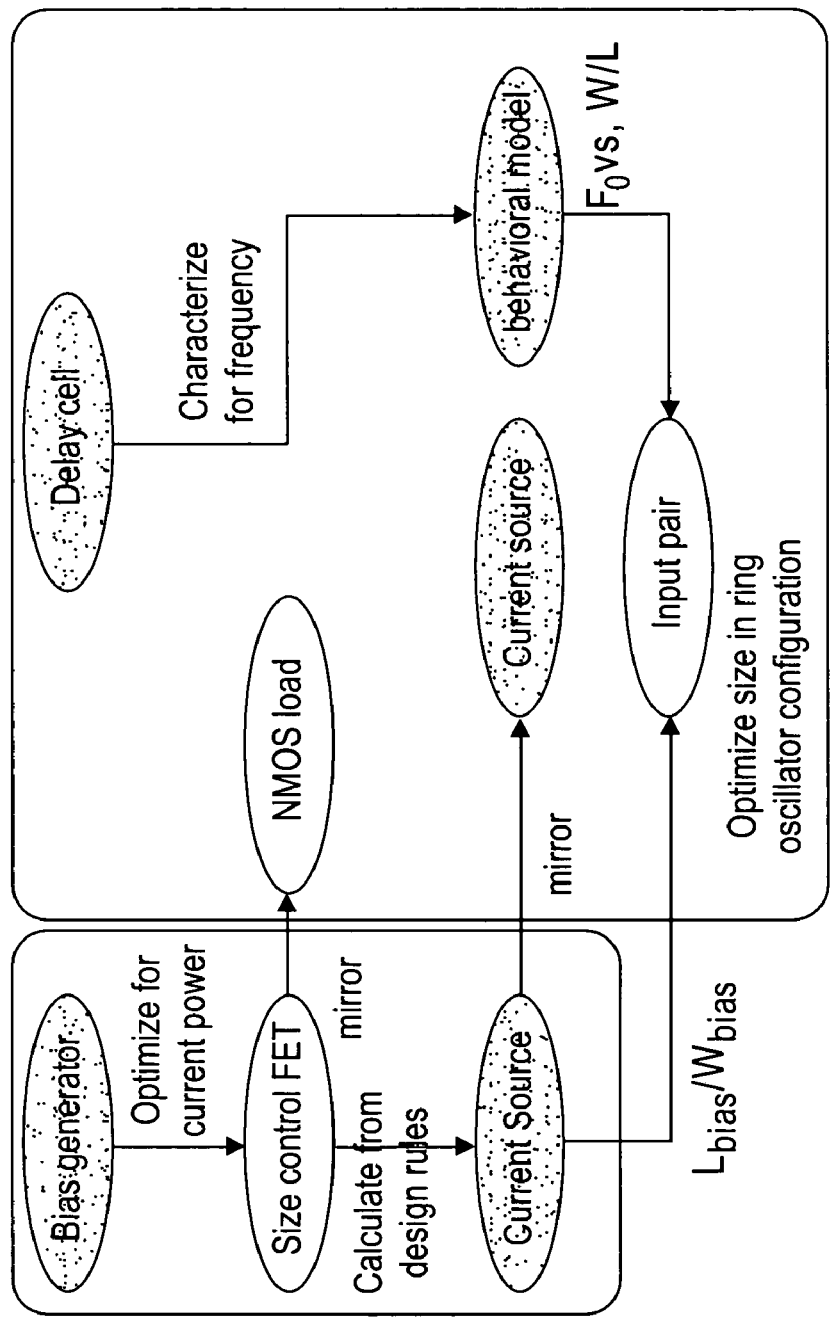
FIG. 15 is a bubble diagram of steps in an example synthesis flow for an oscillator according to the present invention.

In step 2, note FIG. 15, the sizes of the control transistor have been copied and that becomes the load and then the size of the transistors developed are referred to as the input pair by analyzing, optimizing the behavioral model.

The current source 1310 is handled as a clean-up step at the end. It's hasn't been skipped, we're just saving if for the end. It says "calculate from a design rule" so an optimization doesn't have to be run. The input pair 1350 is the two (delay ring) transistors 860 and 870 of FIG. 8.

Figure 16:
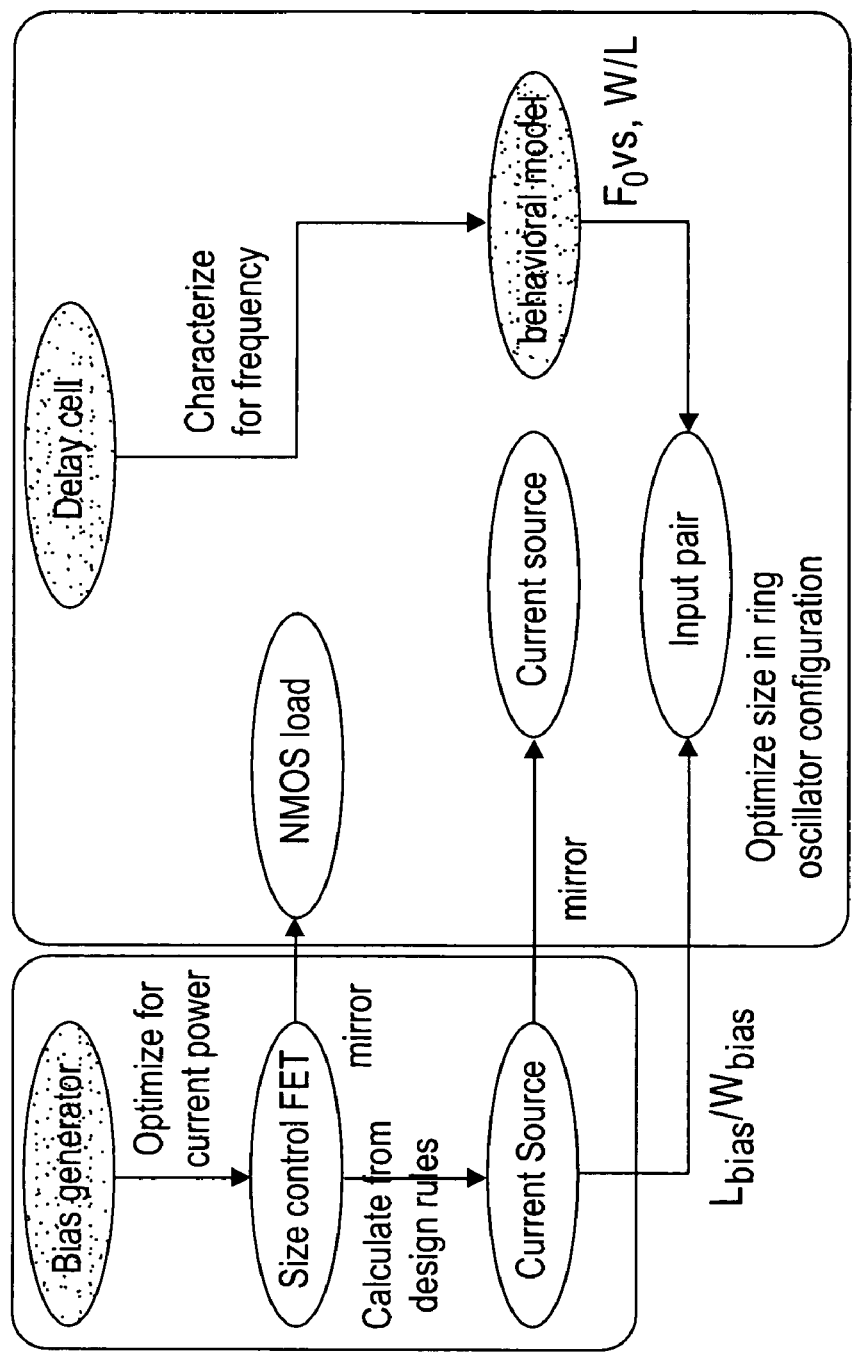
FIG. 16 is a bubble diagram of steps in an example synthesis flow for an oscillator according to the present invention.

For the finish steps, note FIGS. 16 and 17, all the sizes are available which are then plugged back into the circuit, and the performance can be verified by simulation (using SPICE, for example). If the optimization models were accurate, then that should just be one simple verification step without any iteration. Because it was used to develop the model to begin with but computation steps in between are saved.

So, to the degree that the models built are accurate, then the verification step goes very quickly. The objective is to plug all the dimensions into a circuit because that's what gets used to actually build the chip. The designer needs to know what those dimensions are. That's what gets laid out.

Design synthesis relies heavily on running circuit optimization and the traditional methods for running circuit optimization are very inefficient, and so we could try and be expert mathematicians and make better optimization algorithms, but if we always keep going back to simulation models to do it, we really won't make very much headway. The synthesis system allows us to break through and do optimization much, much faster than it was ever done before.

An expert circuit designer that knows how to develop these circuits on his own would build a plan, that is basically a program, like the flow/bubble diagrams in FIGS. 13–16, that can get executed by software automatically, which would be called a synthesis plan. It's basically a program for how to build a certain type of circuit. The synthesis plan would become part of a library.

One need for synthesis plans is by people who don't know how to build those types of circuits. In the present invention, with a design plan and a library, for instance, the voltage controlled oscillator of FIG. 8, if that's what somebody needed to put on their chip, rather than have somebody go off and sit down and design it, they would just execute the corresponding plan from the library. The idea is then that the design would be built for them so they don't have to have expert knowledge of how one would sit down and construct a voltage controlled oscillator, because somebody has already put that into a program that can be executed.

A user who might need a 100 MHz oscillator, or a 200 MHz oscillator would execute the same plan with a different performance spec for MHz. Every user might have a different requirement, depending on what his performance specifications are. Then, the synthesis engine would go step by step through the bubble diagram.

Each plan would look different depending on the circuit, depending on types of models that were constructed for the plan. What the plan does is take the specification from the user and convert it into the optimization goals that are used for calculations. It's a reverse of the process that the designer went through. The designer sat down and developed a circuit to build the models and now the user sits down and uses the models to build the circuit. So all the knowledge about the circuit is encapsulated in the models and the plan.

Each plan would come along with its own set of models that describe the characteristics of a circuit. It could be a polynomial or it could be some other type of mathematical expression, or it could just simply be a table, a spreadsheet for example.

The plan identifies which models need to be used at each step in the process, and then calculates the A0–A3's (see equation 1, for instance), when the model is a polynomial equation. In the case of a polynomial model, an algorithm that does curve fitting is utilized to fit the polynomial expression to the curve, a least squares fitting operation, for example. If the polynomial isn't used, a table could be used as the model, and interpolation between points would determine valves between the points of the table.

There are two sides to the MSS system. There's the first side for how the models get built. When you look at that whole system, that's the plan developer, or author. On the second side, there is the user, possibly a novice user that executes the plan developed by the plan author.

The author chooses between a number of different options for how he models his circuits so he has to choose, and he would probably try different ones out to see how well they worked. But once the author decides on a set of models, then the user using the plan just never sees it, the user just runs it (providing selected inputs such as performance specs, as described above).

When the user selects a plan, he's really selecting a predetermined script, or selecting a circuit and the variables in the circuit are what's identified in the polynomial or model. They are variables and if we were only designing a circuit to achieve one specification for performance, then it wouldn't be very useful. But the idea here is that you could design a circuit that meets a number of different specifications and it's up to the user to say what it is he wants to do with it. The program will figure out what the circuit should look like to do that. The present invention cuts out many simulations that you would have to do otherwise if you hadn't converted the information to a behavioral model. The models describe what it does if you sat down and measured it. So that's an example of what those curves are (see FIG. 11, for example). They hide all the detail and make it a lot easier to figure out.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, preparation and storage of plans, calculation of curves, simulation of circuits, collection of data points of circuit behavior, curve fitting, table building, interpolation, characterization, parameterization, and the display, storage, or communication of results according to the processes of the present invention.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMS, EPROMS, EEPROMs, DRAMs, VRAMS, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, characterization, synthesis, simulation, and analysis, and the display, storage, or communication of results according to the processes of the present invention.

Appendix A of this application includes an example Synthesis Plan Developer's guide that includes details of a specific embodiment of the present invention. However, as with each of the embodiments discussed herein, it is to be understood that the present invention is not to be limited to this specific example.

The following is a list of MSS design terms and general descriptions:

AMS (A/MS)—Analog Mixed Signal
  Generally refers to the AMS Simulator. Also refers to AMS language for Verilog (Verilog AMS).

Analysis Test Bench—See Test Benches

Behavioral Optimization Model
  Find in broader pattern

Cell Library: Contains one or more circuits ready for synthesis. Contains circuits without information on how to apply them to particular applications.

Characterizer (Characterization System):
  Executes information from the Characterization Plan.
  Used before synthesis.

Characteristic Functions: (Part of Synthesis Library)
  Expressions used to build Behavior Optimization Models (tables, curve fitting expressions of circuit characteristics, etc.)

Characterization Plan:
  A Plan that embodies the information needed to acquire behavior of a given design component within a specified parameter space. Information includes Fabrication Process, Operating Voltage range, Electrical Loading, Temperature, and other user definable parameters.
  The characterization plan has the ability to monitor and control the characterization process while simultaneously storing information required for synthesis and simulation (for example, data used to build a table or perform a curve fit).

Circuit Model:
  A description of an electrical function based on its active and passive components (resistors, transistors, etc.). Describes structure in terms of its components (similar to a spize netlist).

Cost:
  A metric that gives an indication of the quality of the solution. Each performance value is measured and checked against the corresponding performance specification, and its 'closeness' to the performance specification determines how much it contributes to the cost. If all performance specifications are met, the cost is zero.

Design Flow:
  A collection of tools that enable a coherent design process.

Design Parameter (Design Variable):
  A circuit variable that the optimizer varies, such as transistor length and width. Each design parameter has a valid range the values within which the optimizer is allowed to use (e.g. dimensions of a transistor, bias current, etc.) (e.g. 2, anything a designer would sit down and adjust in order to make a circuit meet a performance specification).

Design Variable: See Design Parameter.

Lookup Database: (Part of Synthesis Library) see look-up model.

Look Up Model:
  Collection of 1 or more points acquired or learned via previous analysis of a circuit. To size an analog cell, the optimizer uses a lookup model containing at least one set of design parameters which produces a working circuit.

Master Plan:

Contains instructions readable by two or more tools. The instructions contain situation specific knowledge on how to apply the tools for at least one part of an overall design.

Model: (Examples, generic circuit model, behavioral model, etc.); maps the function of design variables to performance parameters.

Mixed Signal Cell Library: Storage for models and associated test benches and scripts.

Optimum Solution:

A solution whose performance values all meet the user's performance specifications and therefore has zero cost.

Optimization:

A process of determining a solution best sized components, or the best components to configure a circuit that best meets performance characteristics or requirements of a circuit being synthesized.

Optimizer:

Device or software program that performs the process of optimization.

Parameterized Netlist (Part of Synthesis Library): Is a part of the circuit model. Circuit model without any specification of component values, or where all component values are set to variables. Raw representation of the circuit that the user is attempting to synthesize. The Circuit Model relates to parameterized netlist in a similar manner as behavioral models relate to characteristic functions.

Performance Characteristic:

A variable that characterizes a particular performance feature of the circuit, such as power consumption, slew rate, gain.

Performance Parameter: See Performance Characteristic.

Performance Specification:

A constraint that the user specifies on a performance characteristic. The optimizer tries to find a point that meets all performance constraints. A performance specification may be a specific value (a target constraint) or a range of values (bound constraint).

Performance Value:

The measured value for a particular performance characteristic given a point.

Point:

A set of design parameters, and corresponding performance characteristics for a given cell characterized in a given process.

Process Rules: (Part of Synthesis Library)

Process Models: (Part of Synthesis Library)

A description of the component characteristics in a particular fabrication process.

Reference Library: (see Synthesis Library?)

Everything that gets stored for use by the MSS Engine, including Lookup DB, cell libraries, models, etc.

Simulation Control:

Is performed as outlined in the Synthesis Plans and Simulation scripts.

Silicon Calibrated Behavioral Model: (calibrated Behavioral Model) Tables [equations?] mapping of real accumulation of real circuit information to a behavioral model Simulation Plan: Provides specialized simulator controls for different design components.

Simulator (A/MS Simulator): Makes measurements of circuit (performance feature measurements, e.g. power, slew rate, gain, etc).

Solution Space:

The set of all possible points given the set of design parameters and their value ranges.

Solution:

A set of design parameter values determined by the optimizer.

Starting Point:

The first point used by the optimizer to its search.

Synthesis Plan: See Master Plan.

Encapsulates knowledge required to synthesize a given design component. Generates a new device-level component from a high-level hardware description (HDL) based on the individual requirements for the given component under design (Thus, specialized computer instructions are stored in the Synthesis Plan, not the synthesizer).

Synthesis Library: See Reference Library

Synthesis Model:

Relates design parameters (variables that the optimizer changes) to an observable (by evaluation or by measurement) performance characteristic (such as power, gain, slew rate, etc.). It could be a behavioral optimization model, analytic model or other type of circuit model.

Synthesis Toolset: Collection of tools, each of which may be provided instructions by a Synthesis Plan being used. Main operational components of the MSS Engine.

Synthesizer:

Provides basic tools for pattern matching, optimization, cell selection. Controlled by the synthesis plan.

Test Harnesses: See Test Benches.

Test Benches (V-A/MS Test Benches): (Part of Synthesis Library) Describe one or more configurations for making measurements on a circuit and information for a simulator to be able to run the test bench. The analysis test bench models the circuitry that would be external to the device being optimized, such as stimuli, power supplies, and load devices. The test bench also controls the type of analysis that is to be performed for optimization of each performance characteristic. Each analysis test bench may be used more than once, in order to analyze circuit performance over multiple operating conditions of temperature, supply voltage, and fabrication process.

Topology Selection: Process of examining different implementations of circuit in order to choose the best one. [choice based on a Performance Value, or Performance Characteristic, for example]

Obviously, numerous modifications and variations of the present invention are possible in light of the above teachings. It is therefore to be understood that within the scope of the appended claims, the invention may be practiced otherwise than as specifically described herein.

What is claimed is:

1. A system for synthesizing a circuit using mixed signal synthesis, comprising:
   a collection of design tools, each of said design tools configured to produce at least one function of an overall electronic circuit design, said design tools including
      a simulator configured to simulate performance of the circuit being synthesized;
      an optimizer coupled to said simulator and configured to find optimized values for design parameters and evaluate simulation results of the circuit to be synthesized;
      a test bench mechanism configured to set up test benches configured to test the circuit being synthesized under predetermined conditions; and
      a parameter passing mechanism configured to pass the optimized design parameters to said test bench mechanism and said simulator;
   a plurality of synthesis plans associated with a type of circuit component, wherein each of the synthesis plans contains situation-specific instructions that determine how the design tools should be applied to synthesize that circuit component for that particular design situation; and
   wherein one of said plurality of synthesis plans can be selected by a user and executed by the system to control the application of said design tools to synthesize a circuit for a desired design situation.

2. The system according to claim 1, further comprising:
   a cell library having a set of synthesis models, each model having specific data that relates said design parameters to one or more performance characteristics of a circuit represented by the model;
   wherein:
   a synthesis model, selected by a user, selected from said library, is utilized by said test bench mechanism to set up test conditions and measurements of the circuit being synthesized.

3. The system according to claim 1, wherein:
   said synthesis plan includes instructions for setting up at least one test scenario for the circuit being synthesized.

4. The system according to claim 1, wherein:
   said optimizer includes a lookup database of circuit parameters and performance values for the circuit to be synthesized; and
   said optimizer determines said optimized design parameters by referring to a set of target performance values for the circuit being optimized and previous parameters and performance values stored in said lookup database for the circuit being optimized.

5. The system according to claim 1, wherein said optimizer evaluates the simulation results of said simulator by determining if the result meet performance specifications for the circuit being synthesized, and, if the performance specifications are not met, the design parameter values are readjusted based on the evaluated simulation results and the lookup database.

6. The system according to claim 1, wherein the optimizer stores the simulation results of said simulator in the lookup database.

7. The system according to claim 1, wherein:
   said parameter passing mechanism comprises a set of PERL variable assignments, and the optimizer and simulator use the PERL language as their control layer.

8. The system according to claim 7, wherein said variable assignments pass a design parameter value into a PERL script and attach the passed design parameter value to a synthesis model which is then simulated by the simulator.

9. A method of performing mixed signal synthesis of a circuit, comprising the steps of:
   selecting a synthesis plan from a plurality of synthesis plans associated with a type of circuit component, wherein each of the synthesis plans contains situation-specific instructions that determine how the design tools should be applied to synthesize that circuit component for that particular design situation;
   executing the synthesis plan to control the application of design tools to synthesize a circuit for a desired design situation, including
      selecting a set of optimized design parameters for the circuit to be synthesized;
      attaching the optimized design parameters to a synthesis model of the circuit to be synthesized;
      setting up a test bench of testing devices and test conditions for each of required performance characteristics according to the synthesis plan of the circuit to be synthesized;
      simulating the synthesis model and making test measurements identified by the synthesis plan; and,
   synthesizing a circuit for the selected design situation.

10. The method according to claim 9, wherein:
    said step of selecting a set of optimized design parameters for the circuit to be synthesized comprises,
    comparing required performance characteristics of the circuit to be synthesized versus performance characteristics of previously synthesized circuits, and
    selecting a set of design parameter values that equal to a calculated to produce the required performance characteristics based on the previously synthesized values.

11. The method according to claim 9, further comprising the step of:
    storing the simulation results and optimized design parameters in a database for future reference.

12. The method according to claim 9, further comprising the step of:
    repeating said steps of selecting a set of optimized design parameters, attaching the optimized design parameters, setting up a test bench, and simulating the synthesis model;
    wherein the repeated step of selecting a set of optimized design parameters includes consideration of simulation results from the previous performed set of selecting a set of optimized design parameters, attaching the optimized design parameters, setting up a test bench, and simulating the synthesis model.

13. The system according to claim 1, further comprising:
    a synthesis plan library having a set of said synthesis plans, each synthesis plan further including an identification of a circuit model and a set of instruction for managing said design tools; and
    a user interface that allows a user to select a synthesis plan from said synthesis library.

14. The system according to claim 1, further comprising:
    a user interface that allows a user to specify a set of performance parameters for the circuit to be synthesized.

* * * * *